US012657591B2

(12) United States Patent
Carlough et al.

(10) Patent No.: US 12,657,591 B2
(45) Date of Patent: Jun. 16, 2026

(54) AUTOMATED BILLPAY BASED ON CROSS-PROVIDER PERFORMANCE INFORMATION

(71) Applicant: Wells Fargo Bank, N.A., San Francisco, CA (US)

(72) Inventors: Jim Carlough, San Francisco, CA (US); Srinivas R. Doki, San Francisco, CA (US); Debashis Ghosh, Charlotte, NC (US); Richard Claude Robert Trent, Newton, NC (US); Jane Turpin, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 26 days.

(21) Appl. No.: 18/373,837

(22) Filed: Sep. 27, 2023

(65) Prior Publication Data

US 2025/0104072 A1     Mar. 27, 2025

(51) Int. Cl.
*G06Q 40/00*     (2023.01)
*G06Q 20/40*     (2012.01)
*H04L 67/50*     (2022.01)

(52) U.S. Cl.
CPC ....... *G06Q 20/4016* (2013.01); *H04L 67/535* (2022.05)

(58) Field of Classification Search
CPC .......................... G06Q 20/4016; H04L 67/535
See application file for complete search history.

(56) References Cited

U.S. PATENT DOCUMENTS

| | | | |
|---|---|---|---|
| 9,443,268 B1 | 9/2016 | Kapczynski et al. | |
| 9,710,852 B1 | 7/2017 | Olson et al. | |
| 11,544,713 B1 * | 1/2023 | Hansen | G06Q 20/4016 |
| 12,002,055 B1 * | 6/2024 | Miller | G06Q 20/4016 |

(Continued)

FOREIGN PATENT DOCUMENTS

WO     WO-2017189114 A1 *  11/2017   ............. G06Q 40/06

OTHER PUBLICATIONS

Kiley: "Financial Conditions and Economic Activity: Insights from Machine Learning", FEDS Working Paper No. 2020-95 , Finance and Economics Discussion Series, Federal Reserve Board, Washington, D.C., Nov. 17, 2020 (Year: 2020).*

*Primary Examiner* — Edward J Baird
(74) *Attorney, Agent, or Firm* — Foley & Lardner LLP

(57)     ABSTRACT

Systems, methods, and computer-readable storage media for performance indicator operations. One method includes identifying, by one or more processing circuits, user activity data and one or more performance indicators of a user. The method further includes modeling, by the one or more processing circuits, the user activity data and the one or performance indicators to generate a user data structure. The method further includes determining, by the one or more processing circuits, the user data structure causing an update in the one or more performance indicators. The method further includes configuring an actionable activity corresponding to the at least one future activity of the user, wherein the actionable activity is below a user threshold. The method further includes generating and presenting, by the one or more processing circuits, a graphical user interface (GUI) including actionable elements and at least one message associated with the actionable activity.

20 Claims, 9 Drawing Sheets

(56)                    References Cited

U.S. PATENT DOCUMENTS

| | | | |
|---|---|---|---|
| 2009/0228307 A1* | 9/2009 | Sorbe | G06Q 40/08 |
| | | | 705/38 |
| 2010/0094791 A1* | 4/2010 | Miltonberger | G06Q 10/067 |
| | | | 706/46 |
| 2012/0116951 A1 | 5/2012 | Chung et al. | |
| 2014/0258083 A1 | 9/2014 | Achanta et al. | |
| 2015/0026027 A1* | 1/2015 | Priess | G06Q 10/04 |
| | | | 705/35 |
| 2017/0004501 A1* | 1/2017 | Ledford | G06Q 20/4016 |
| 2018/0005230 A1* | 1/2018 | Zovi | G06Q 20/0457 |
| 2020/0257608 A1* | 8/2020 | Fradkin | G05B 23/0254 |
| 2020/0273040 A1* | 8/2020 | Novick | G06Q 20/4016 |
| 2020/0304592 A1* | 9/2020 | Park | H04L 67/75 |
| 2020/0364785 A1 | 11/2020 | Olson et al. | |
| 2021/0279819 A1 | 9/2021 | Maheshwari | |
| 2022/0129871 A1* | 4/2022 | Rodgers | G06Q 20/108 |

* cited by examiner

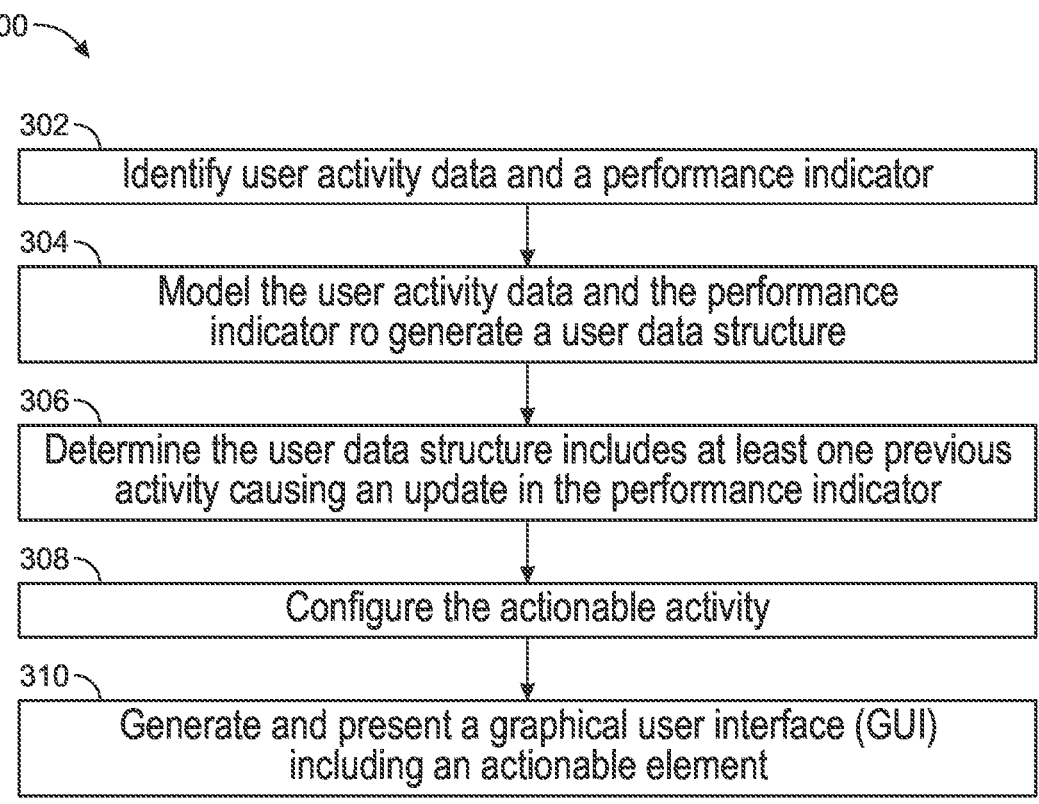

300

302 — Identify user activity data and a performance indicator

304 — Model the user activity data and the performance indicator ro generate a user data structure 306 — Determine the user data structure includes at least one previous activity causing an update in the performance indicator 308 — Configure the actionable activity 310 — Generate and present a graphical user interface (GUI) including an actionable element

FIG. 3

AUTOMATED BILLPAY BASED ON CROSS-PROVIDER PERFORMANCE INFORMATION

TECHNICAL FIELD

The present disclosure relates generally to the field of performance analysis and content customization and presentation, including enabling automated actions within a bill payment application.

BACKGROUND

In a computer networked environment such as the internet, entities such as people or companies provide content for display associated with a performance with the entity. Entities that provide the content may desire to provide content associated with the customer's performance external to the entity, such as the customer's performance with respect to a bill payment where the provided content includes modification or implementation of a feature of a bill payment application.

SUMMARY

Some arrangements relate to a method. In some arrangements, the method includes identifying, by one or more processing circuits, user activity data and one or more performance indicators of a user. In some arrangements, the method includes modeling, by a processing circuit, the user activity data and the one or more performance indicators to generate a user data structure. In some arrangements, the user data structure corresponds to at least one future activity of the user. In some arrangements, the method includes determining, by a processing circuit, the user data structure includes at least one previous activity causing an update in the one or more performance indicators. In some arrangements, the method includes a response to determining an actionable activity associated with the previous activity. In some arrangements, the method includes the response to be configuring, by a processing circuit, the actionable activity corresponding to the future activity of the user. In some arrangements, the method includes determining the actionable activity is below a user threshold. In some arrangements, the method includes generating and presenting, by a processing circuit, a graphical user interface (GUI) to include at least one actionable element and at least one message associated with the actionable activity.

Some arrangements relate to a computer system. The system includes a processing circuit configured to identify user activity data and one or more performance indicators of a user. In some arrangements, the processing circuit is also configured to model the user activity data and the one or more performance indicators to generate a user data structure. The user data structure corresponds to at least one future activity of the user. In some arrangements, the processing circuit is also configured to determine that the user data structure includes at least one previous activity of the user causing an update in the one or more performance indicators. In some arrangements, the processing circuit is also configured to configure the actionable activity corresponding to the at least one future activity of the user in response to determining an actionable activity associated with the at least one previous activity. In some arrangements, the processing circuit is also configured to determine the actionable activity is below a user threshold. The processing circuit is also configured to generate and present a graphical user interface (GUI) including at least one actionable element and at least one message associated with the actionable activity.

Some arrangements relate to a computer-readable storage medium (CRM) having instructions stored thereon that, when executed by at least one processing circuit, cause the at least one processing circuit to perform operations. The operations include identifying, by the at least one processing circuit, user activity data and one or more performance indicators of a user. In some arrangements, the operations include modeling, by the at least one processing circuit, the user activity data and the one or more performance indicators to generate a user data structure. In some arrangements, the user data structure corresponds to at least one future activity of the user. In some arrangements, the operations include determining, by the at least one processing circuit, the user data structure includes at least one previous activity of the user causing an update in the one or more performance indicators. In some arrangements, the operations include configuring, by the at least one processing circuit, the actionable activity corresponding to the at least one future activity of the user. In some arrangements, the actionable activity is below a user threshold. In some arrangements, configuring the actionable activity is in response to determining an actionable activity associated with the at least one previous activity. In some arrangements, the operations include generating and presenting, by the at least one processing circuit, a graphical user interface (GUI) including at least one actionable element and at least one message associated with the actionable activity.

BRIEF DESCRIPTION OF THE DRAWINGS

FIG. 3 is a flow diagram of a method for cross-provider activity modeling, according to example embodiments.

DETAILED DESCRIPTION

Figure 1:
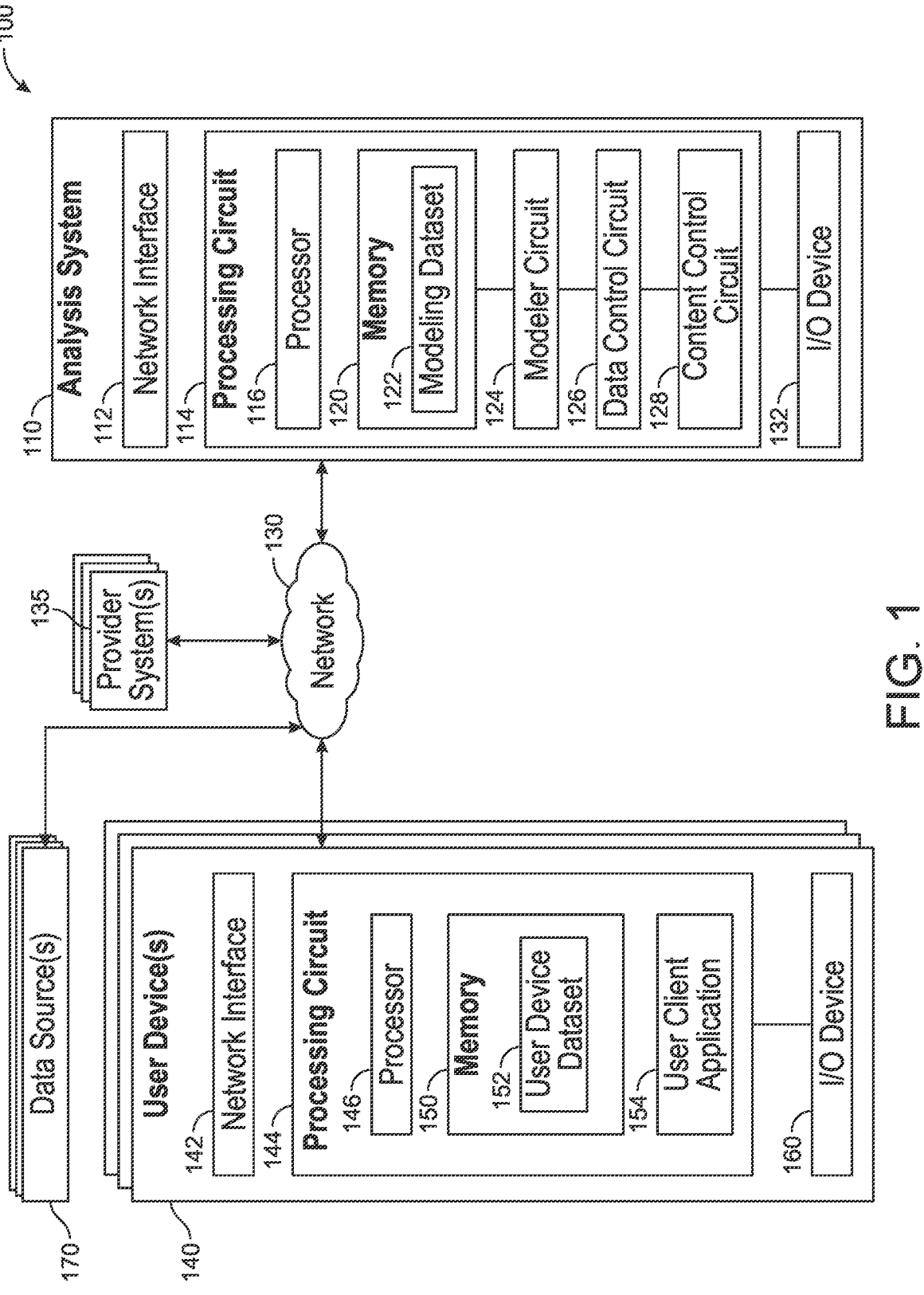
FIG. 1 is a block diagram of an activity modeler architecture including an analysis system, according to example embodiments.

Referring generally to the Figures, the systems and methods described herein relate to modeling activities and performance of an entity to determine future activities. The systems and methods described herein generally relate to implementing a system that can predict future events of an entity across the entity's complete profile (i.e., holistic approach). In typical systems, a computer device (e.g., desktop computer, mobile device, smart device) can present a variety of content (e.g., within the viewpoint of the computing device) relating to compartmentalized perfor- mance of the entity. The systems and methods described herein generally relate to transparently providing an entity with complete knowledge of their entire profile, along with providing future actionable activities, based on an entity's activity data, aimed at improving an entity's profile. In particular, the present disclosure relates to improving an entity's profile (e.g., financial profile, performance indica- tors) through resource allocation authorizations to determine and generate bundled resource authorization.

Additionally, in some systems regarding performance, the entity can be presented with a performance indicator that is days, weeks, months, or years old. Having a performance indicator that is not based on current interaction data can lead to an entity's reliance on the non-current performance indicator, leading to a decision or lack of decision-making that can affect a future performance, adversely affecting an entity's profile and their knowledge thereof. Accordingly, the present disclosure is directed to systems and methods for generating, providing, and presenting a real-time (or near real-time), holistic view of a user's performance (e.g., current economic credit position, account status across pro- viders, etc.). The user's performance can then be used to generate, predict, and summarize future events. Further- more, the present disclosure improves data security by reducing the need to share information across providers (e.g., banks, credit providers, investment services, corporate institutions). The present disclosure also improves data privacy which often is a hurdle to overcome when providers attempt to communicate between each other. The present disclosure is aimed at improving both usability and data security, ensuring customer protected data (e.g., transaction data, financial data, account data) stays within the purview of operating providers (e.g., credit reporting agencies) while still providing insights to the entity. That is, the systems and methods mitigate the need to share this sensitive data across multiple providers, thereby further enhancing data security.

Moreover, the present disclosure is directed towards improvements in existing forecasting architectures. The present disclosure enhances the precision of data analysis by using a predictive model to generate a holistic picture of a user's economic positions across providers. The predictive model of the present disclosure improves existing systems by accurately anticipating future activities and potential events (e.g., overdraft scenarios, late payment predictions, investment mitigation or risk analysis, spending behavior analysis, interest rate change impact, liquidity risk forecast- ing, loan prepayment predictions, market fluctuation predic- tions, regulatory compliance mitigation or risk) based on a predictive model that adapts to each customer's activity and habits. The present disclosure is directed towards capabili- ties that go beyond providing a snapshot of the user's profile (e.g., credit score), especially within a data isolated institu- tion, through a predictive model capable of dynamically generating predictions across providers.

Furthermore, the systems and methods of the present disclosure are directed towards improvements to economic tools that are generally passive. The present disclosure provides for active systems capable of established alert thresholds and predict potential un-advantageous situations to provide an active personalized tool to reduce potential negative events associated with a customer or provider institutions. The customized system of the present disclosure is individualist and provides improvements to data valida- tion and extraction processes. Additionally, the user specific graphical user interfaces provide the end user with control over how the content is executed, providing an improved user interface. Therefore, aspects of the present disclosure also address problems in content presentation by providing improved presentation technology for the presentation of content on computer devices. In particular, the present disclosure addresses the technical challenges in interfacing by presenting personalized content. In one example, one or more processing circuits of the electronic devices can deter- mine the amount of use of each task and indicators over a period of time and determine how much memory has been allocated to various tasks and indicators over a period of time (e.g., analysis system tracking memory usage for incoming exchanges and their effects on performance indi- cators over a period of a time) such that adjustments to the user interface can be done in real-time (e.g., end high memory usage processes, allocate more memory usage to certain processes, enable more memory for usage, and so on).

Referring to FIG. 1, a block diagram of an activity modeler architecture 100 including an analysis system 110 is shown, according to potential embodiments. The analysis system 110 can be associated with a provider, such as a service provider, bank, or financial institution (FI). The activity modeler architecture 100 further includes one or more user devices (e.g., user device 140), one or more data sources (e.g., data source 170), and an analysis system 110 (e.g., a computing system of a location of the FI). In some embodiments, the analysis system 110, user device 140 (as well as any additional user devices), and data source 170 are communicatively coupled. In some embodiments, the com- ponents of the activity modeler architecture 100 may be communicably and operatively coupled to each other over a network, such as network 130, that permits the direct or indirect exchange of data, values, instructions, messages, and the like (represented by the double-headed arrows in FIG. 1). The network 130 may include one or more of a cellular network, the Internet, Wi-Fi™, Wi-Max™, a pro- prietary provider network, a proprietary retail or service provider network, and/or any other kind of wireless or wired network.

Each system or device in activity modeler architecture 100 may include one or more processors, memories, and network interfaces (sometimes referred to herein as a "net- work circuit"). The memory may store programming logic that, when executed by the processor, controls the operation of the corresponding computing system or device. The memory may also store data in databases. For example, memory 120 may store programming logic that when executed by processor 116 within processing circuit 114, causes an update in the modeling dataset 122 from a user's account with information received from a user device 140 and/or data sources 170. The various components of devices in activity modeler architecture 100 may be implemented via hardware (e.g., circuitry), software (e.g., executable code), or any combination thereof. Devices and components in FIG. 1 can be added, deleted, integrated, separated, and/or rearranged in various embodiments of the disclosure.

The analysis system 110 may be operated by a provider, such as an entity, a consultant, a retailer, a service provider, a bank, a financial institution (FI) and so on. The analysis system 110 includes a network interface 112 and can be structured and used to establish connections with other computing systems and devices (e.g., the user devices 140, the data source 170, etc.) via the network 130. The network interface 112 includes program logic that facilitates connection of the analysis system 110 to the network 130. For example, the network interface 112 may include any combination of a wireless network transceiver (e.g., a cellular modem, a Bluetooth™ transceiver, a WiFi™ transceiver, etc.) and/or a wired network transceiver (e.g., an Ethernet transceiver). In some arrangements, the network interface 112 includes the hardware (e.g., processor, memory, and so on) and machine-readable media sufficient to support communication over multiple channels of data communication. Further, in some arrangements, the network interface 112 includes cryptography capabilities to establish a secure or relatively secure communication session in which data communicated over the session is encrypted. In various embodiments, the activity modeler architecture 100 can adapt to network traffic needs by compressing content, by any computing device described herein, and sending it (e.g., via network 130) to various other computing devices, by adjusting security filters to remove junk traffic off network 130 (e.g., by monitoring packets), and so on. While described with regards to a provider, the analysis system 110 may be used in other scenarios. For example, the analysis system 110 may be used at a car dealership or car rental company, a hotel, a booking agent, and/or a medical office.

The processing circuit 114 includes a processor 116, a memory 120, a modeler circuit 124, a data control circuit 126, and a content control circuit 128. In other embodiments, the processing circuit 114 may contain more or less components than are shown in FIG. 1. The components of FIG. 1 are meant for illustrative purposes only and should not be regarded as limiting in any manner. The memory 120 may be one or more devices (e.g., RAM, ROM, Flash memory, hard disk storage) for storing data and/or computer code for completing and/or facilitating the various processes described herein. The memory 120 may be or include non-transient volatile memory, non-volatile memory, and non-transitory computer storage media. Memory 120 may include database components, object code components, script components, or any other type of information structure for supporting the various activities and information structures described herein. Memory 120 may be communicably coupled to the processor 116 and include computer code or instructions for executing one or more processes described herein. The processor 116 may be implemented as one or more application specific integrated circuits (ASICs), field programmable gate arrays (FPGAs), a group of processing components, or other suitable electronic processing components. As such, the analysis system 110 is configured to run a variety of application programs and store associated data in a database of the memory 120 (e.g., modeling dataset 122). One such application may be to provide data to the modeler circuit 124, data control circuit 126, and content control circuit 128.

As used herein, "activity data" refers to data of an account and/or identifier that is associated with economic or financial positions of the entity. That is, activity data may create inferences about a person's borrowing practices. In some embodiments, activity data may involve qualitative data, quantitative data, or a combination of qualitative and quantitative data. Activity data could refer to of bill payments, payment history, opening credit lines, amount owed, length of credit history, credit mix, new credit, closing credit lines, or debt repayment across at least one provider and includes at least one of performance indicator data, historical exchange settlements, and account exchange information. Furthermore, activity data may also encompass broader financial aspects such as revenue streams, expenditure patterns, asset management, liability assessments, investment portfolios, and overall fiscal strategies. Additionally, activity data may encompass real-time or near-real-time transactions, reflecting an up-to-the-minute snapshot of the entity's financial status. Activity data may include, but is not limited to, employment history, income stability, education level, professional qualifications, assets (liquid and non-liquid), criminal record, character and fitness, professional reputation, fiscal responsibility, and so on. In some embodiments, the activity data may be specific to a certain activity. For example, driving records (e.g., vehicle accident reports) may be relevant activity data for a car loan and home activities (e.g., property damage) may be relevant activity data for a mortgage. Activity data may also affect a user's MDP score. For example, a user that has a history of fraudulent activity is probably less likely to pay back. A user with a history of fraudulent activity, therefore, would likely have a lower MDP score than a user without such a history. In some embodiments, performance indicators correspond to a user's credit history and include at least one of a user's performance indicator data, historical exchange settlements, account exchange information across at least one provider, and other similar data. "Future activity data" refers to the above defined activity data that a user may take in the future.

As used herein, a "performance indicator" refers to any measurement of user/entity performance, often financially or economically related (e.g., person's borrowing practices). That is, performance indicators can illustrate whether a person is a reliable borrower (i.e., a person that makes payments on time, has a stable debt-to-income ratio, possesses a history of responsible credit use, and/or maintains a diverse mix of credit types). In some embodiments, performance indicators may involve qualitative data, quantitative data, or a combination of qualitative and quantitative data. Performance indicators may include, but are not limited to, a variety of well-established creditworthiness metrics, such as credit scores (e.g., FICO score and VantageScore), user debt-to-income (DTI) ratio, credit utilization ratio (CUR), payment history, length of credit history, credit mix, public credit records (e.g., bankruptcies, tax liens, judgements, foreclosures, etc.), and so on. In some embodiments, a performance indicator may be determined based on a plurality of performance indicators. For example, determining a credit score may involve analyzing a person's credit mix, payment history, and length of credit history. In some embodiments, the performance indicators are produced by third-parties. For example, the credit score may be produced by credit bureaus (e.g., Equifax, Experian, and TransUnion). Performance indicators may affect a user's MDP score. For example, a low credit score may negative effect on a user's MDP score, but a low DTI ratio may have a positive effect on a user's MDP score. For example, a performance indicator could refer to credit score, credit report, debt-to-income ratio (DTI), payment history, income stability, debt utilization ratio, savings and asset levels, among other performance standards. In another example, a performance indicator could refer to net profit margin, return on investment (ROI), cash flow forecasts, equity ratios, liquidity ratios, or customer retention rates, each reflecting various aspects of an entity's financial health and operational efficiency. In particular, a performance indicator can be construed as a snapshot (e.g., real-time or near real-time) or representation of the financial health of an entity or account at a given point in time. It's a multidimensional concept that encapsulates various economic indicators such as the entity's solvency (its ability to meet long-term obligations), assets (what it owns), liabilities (what it owes), and other related financial markers. Often, the analysis system 110 can set rules for determining a performance indicator based on activity data. For example, one type of performance indicator, credit score is based on the activity data of amounts owed, new credit, length of credit history, payment history, credit mix, and so on.

As user herein, an "actionable activity" refers to any activity that can be taken by a provider in response to activity data. For example, an actionable activity can refer to making a payment, automating future payments, remediating past payments, remediating past missed payments, consolidating lines of credit, generating a reward, performing a fraud check on exchanges, generating a notification, register a new account or line of credit, paying a minimum, or other provider activities. In another example, an actionable activity can refer to initiating a financial danger assessment, tailoring personalized financial products, or restructuring existing financial arrangements in alignment with the user's current financial standing. It may also encompass engaging in proactive communication with the entity to provide financial counseling, recommend investment strategies, or offer assistance in budget planning. It should be understood that the actionable activities can be automatically performed (e.g., in real-time, after entity approval, after predefined time) by the modeler circuit 124 which can be configured to interpret and respond to various triggers and conditions within the activity data. Through a systematic integration with relevant financial systems (e.g., API integration), the modeler circuit 124 can automatically execute a range of activities such as payment processing, credit line management, detections, and customer communication, all aligned with the predefined criteria and the financial context of the entity. The automated capabilities of the modeler circuit 124 can increase efficiency and responsiveness, and ensure a consistent and informed approach in handling the multifaceted financial or economic needs of the entity.

As used herein, "resource allocation authorizations" refer to permissions or rights granted by one or more provider computing systems to access and utilize specific resources, guided by certain authorization parameters. These authorization parameters may define the extent and manner in which various financial systems, databases, or computational capabilities can be accessed and applied. The resource allocation authorizations may be analyzed, bundled, and modeled to generate new authorization parameters, potentially considering common or conflicting aspects across different authorizations. Accordingly, this process enables the creation of a bundled resource authorization that aligns with predefined rules or user-defined preferences, ultimately aiming to provide a positive impact on performance indicators related to the financial or economic health of an entity. Additionally, the resource allocation authorizations provide a role in managing obligations, such as debt repayment, through the estimation of elimination periods and other financial strategies.

The processing circuit 114, interacting (e.g., communicating with by sending requests and/or commands/signals) with the memory 120 can store a variety of data in the modeling dataset 122, according to some embodiments, including user data structures. The modeling circuit 124 can use data stored in the modeling dataset 122 and other gathered data to generate a user data structure which could then be stored in the modeling dataset 122. The modeling dataset 122 may also be configured to store a user data structure which can include updated personal information for customer accounts associated with the provider (e.g., the FI). For example, the modeling dataset 122 can store personal user information that models account activity affecting performance indicators, such as previous exchanges for loans, bills, credit card payments, payments to other accounts either owned or not owned by the user, among other exchanges. The modeling dataset can store other personal user information used in modeling activity such as name, age, gender, address, education, occupation, etc., customer preferences, such as notification preferences, security preferences, etc., and authentication information, such as customer passwords, biometric data for the customer, geometric information (e.g., latitude, longitude), etc. In some embodiments, the modeling dataset 122 can include a token vault that stores an associated customer token and/or device token for each customer account. The modeling dataset 122 may further be configured to store financial data for each customer account, such as past transactions, different provider account information (e.g., balances, debt, type of account, etc.), investments, loans, mortgages, and so on.

In some embodiments, the memory 120 and modeling dataset 122 may be communicably coupled to the modeler circuit 124, data control circuit 126, or content control circuit 128. It should be understood that "circuit" used herein can be any processing circuit(s) or computational systems designed to perform specific tasks, including but not limited to microprocessors, microcontrollers, application-specific integrated circuits (ASICs), field-programmable gate arrays (FPGAs), or any combination thereof, capable of executing the required functions and operations for handling, analyzing, and processing the activity data, performance indicators, and actionable activities as described herein. The modeler circuit 124 can implement modeling operations of the analysis system 110. In various arrangements, the modeler circuit 124 can be configured to receive a plurality of data from a plurality of data sources (e.g., memory 120, modeling dataset 122, data control circuit 126, content control circuit 128, user device 140, data source 170) via one or more data channels (e.g., over network 130). Each data channel may include a network connection (e.g., wired, wireless, cloud) between the devices or systems and the analysis system 110. For example, the modeler circuit 124 could query the memory 120 for data of the modeling dataset 122 and use the modeling data to generate a user data structure that models user activity data and one or more performance indicators (e.g., the modeling dataset that includes items such as past bills can be used by the modeling circuit 124 to create a user data structure that resembles an up to date credit score).

The modeler circuit 124 can be further configured to receive new activity data or an updated performance indicator from the input/output device 132 of the analysis system 110 or from the modeling dataset 122. For example, the modeler circuit 124 may be configured to continuously monitor and receive new information from a user device 140, data source 170, or provider system 135 via the network 130 and determine the effect on the one or more performance indicators. New data can affect the modeling dataset 122 and thereon after the modeler circuit 124, data control circuit 126, content control circuit 128, and other parts of the analysis system 110. For example, a user could pay off a previous debt after their activity data has already been sent to the analysis system 110. A source (e.g., user device 140, data source 170, or provider system 135) may then send the activity data, (e.g., debt payment) to the analysis system 110. Because debt payment can be a significant factor affecting the performance indicator, not only would the modeling dataset 122 be updated, but the modeler circuit 124 would update the user data structure. For example, the debt payment could cause the modeler circuit 124 to change the credit capabilities of the user, which affects what products and actionable activities are available to the user.

For example, the modeler circuit 124 can be configured to model user activity data and the one or more performance indicators to generate a user data structure. In some embodiments, the data structure created by the modeler circuit 124 corresponds to at least one past, current, and/or future activity of the user. The modeler circuit 124 can continuously update the user data structure based on continuously updating the user activity data received by the analysis system 110 from various sources (e.g., user device 140, data sources 170, or provider systems 135). Because many of the performance indicators can be proportional to changes in activity data, the modeler circuit 124 can continuously update the user data structure in response to updated user activity data. For example, if a user were to open a new line of credit, the modeler circuit 124 could determine the effect of the new line of credit has on the user data structure to determine what products the provider could offer. For example, the modeler circuit could update the user data structure and determine that the new line of credit could allow the customer to consolidate other lines of credit into the new one, consolidate bill payments into the new credit line, or simply update the user data structure to note a new line of credit and its effects on other performance indicators, among other capabilities.

In some embodiments, the modeler circuit 124 can determine that new data in the modeling dataset 122 contains a discrepancy or violation. For example, the modeling dataset 122 could receive new activity data or performance indicators including an updated economic or credit report on the user. When the modeler circuit 124 uses the updated activity data to create an updated user data structure, the modeler could flag a discrepancy in the updated activity. For example, the credit report could include a false line of credit that the previous activity data did not include. The modeler circuit 124 could then model the user activity data to create a user data structure that denotes a false line of credit to be addressed by the data control circuit 126 or content control circuit 128.

In some embodiments, the modeler circuit 124 can model activity data to determine information such as how performance indicators are affected based off the data in the memory 120 and rules on how activity data and performance indicators affect a user data structure, future activities, and performance indicators, among other. The modeler circuit 124 can be configured to perform data fusion operations, including operations to generate and/or aggregate various data structures stored in memory 120. For example, the modeler circuit 124 can be configured to aggregate data stored in memory 120, such as aggregating the total amount of lines of credit open by a user for purposes of determining if a new line of credit could be opened or if the user would benefit from consolidating lines of credit. The data may be a user data structure associated with a specific user entity and include various data from a plurality of data channels.

In some embodiments, the modeler circuit 124 can determine that the user data structure includes previous activity of the user causing an update in one or more performance indicators. In some embodiments, the modeler circuit can provide information to the data control circuit 126 and content control circuit 128. For example, if a user were to repeatedly pay a number of bills on time for an extended period of time, the modeler circuit 124 may determine an increase in a user's performance indicator. The modeler circuit 124 can determine through its modeling that the bill payments warrant an increase in one or more performance indicators and indicate to the data control circuit 126 or content control circuit 128 to update the GUI to present the update to the user.

In some embodiments, the modeler circuit 124 can determine, based on the data in memory 120, that a user's activity data, if altered in a future scenario, could provide an additional benefit to one or more of the performance indicators. In some embodiments, the modeler circuit 124 can identify a plurality of resource allocation authorizations associated with at least two provider computing systems (e.g., provider systems 135, data sources 170). In some embodiments, the plurality of resource allocation authorizations may correspond to at least one authorization parameter to utilize one or more resources of each of the provider systems (e.g., provider systems 135, data sources 170). In some embodiments, the modeler circuit 124 could further determine a bundled resource authorization to offer the user to be presented to the user by the data control circuit 126 or content control circuit 128. In some embodiments, the bundled resource authorization includes the modeler circuit 124 generating one or more new authorization parameters based on the authorization parameters of each of the provider systems 135. For example, the modeler circuit 124 could determine, based on data in the memory 120 that a user has lines of credit open with multiple providers or bills being paid at multiple providers. If the lines or credits or bill payments satisfy predetermined rules for configuring future activity such as offering a bundled line of credit, then the modeler circuit 124 may configure a bundling scenario and indicate to the data control circuit 126 or content control circuit 128 to update the GUI to present the scenario to the user.

In some embodiments, the modeler circuit 124 can determine one or more common parameters across the plurality of resource allocation authorizations and can determine one or more conflicting parameters across the plurality of resource allocation authorizations. In some embodiments, the modeler circuit 124 can model the one or more common parameters and the one or more conflicting parameters to generate the one or more new authorization parameters. In some embodiments, modeling includes combining one or more common parameters and resolving the one or more conflicting parameters based on a set of predefined rules or user-defined preferences. For example, if a user has lines of credit open at multiple institutions, the processing circuit 114 could combine the lines of credit together into one line. Further, the processing circuit could identify if the different institutions have conflicting parameters such as associated a different credit score with the user and resolving the discrepancy. In some embodiments, consolidating the plurality of resource allocation authorizations into the bundled resource authorization is done to provide a positive impact on the one or more performance indicators. For example, the processor circuit 114 and modeler circuit 124 may only provide a consolidation of bundled lines of credit if consolidation positively affects a user's credit score. In some embodiments, the bundled resource authorization includes an estimated elimination period for satisfying one or more obligations associated with the plurality of resource allocation authorizations. For example, the processing circuit 114 may provide for an education aspect such as providing an estimated payoff time to pay off debt from one or more of the user's credit lines.

For example, common parameters might be identified when two provider computing systems adhere to the same regulatory compliance standards, thus allowing for a unified approach to data security and access control. In this example, the modeler circuit 124 can combine these common parameters into a single set of authorization rules. Conversely, conflicting parameters may arise when different provider systems have divergent interest rates or lending criteria for lines of credit. One provider system might offer preferential rates to long-standing customers, while another provider system may base its rates on recent credit history. In such a case, the modeler circuit 124 would identify and resolve these conflicts, potentially by adopting an averaged interest rate or by applying predefined rules that prioritize one provider's criteria over the other. In another example involving three providers, there might exist both common and conflicting parameters within the resource allocation authorizations. For example, all three providers might adhere to a common parameter such as a standardized data encryption protocol for securing financial transactions. This commonality ensures that data integrity and security measures are uniform across all systems. However, conflicting parameters may emerge in areas such as lending policies or customer rewards programs. Provider A might offer a line of credit with a reduced interest rate for new customers, Provider B may prioritize a rewards program based on customer loyalty, while Provider C might have a hybrid approach combining both elements. In this example, the conflicting parameters represent divergent strategies for customer engagement and retention. The modeler circuit 124 would identify these conflicts and might resolve them by creating a new bundled resource authorization that attempts to balance or harmonize these different approaches. The resolution could involve a weighted scoring system that takes into account the unique offerings of each provider, creating a tailored financial product that reflects the entity's particular needs and preferences.

In some embodiments, the processing circuit 114 can monitor the one or more performance indicators based on continuously receiving new information from a user device of the user (e.g., user device 140), one or more data sources (e.g., data source 170), and one or more provider systems (e.g., provider system 135). For example, the processor can determine a user plan based on the user activity data, such as a plan aimed to increase a credit score. The processing circuit 114 will then continuously monitor user activity relating to the plan, and the modeler circuit 124 can continuously monitor user activity to update the user data structure. In some embodiments, the processing circuit 114 can determine a discrepancy in the user activity data or performance indicators based on previous activity of the user. For example, a credit report could include a line of credit that the customer did not have. In some embodiments, the processing circuit 114 can determine a violation associated with the actionable activity based on a comparison between user activity data or a performance indicator and a desired action for increasing the performance indicator. In some embodiments, the comparison identifies an activity that is counter to the desired action. For example, the user may pay a bill late after having a plan to increase their credit score. In some embodiments, the processing circuit 114, through the data control circuit 126 or content control circuit 128, can remediate the discrepancy or violation by at least one of presenting an alert on the GUI including remediation instructions for the user, or establishing, via an alert on the GUI, a communication session with an external system associated with the counter activity to the desired action. In some embodiments, the processing circuit can additionally update the external system to remove or update the counter activity to the desired action or initiating an exchange between an account of the user and the external system. For example, in response to the bill being paid late, the system could contact the company that allowed payment to be made late, contact a credit card company to close a new account, or initiate a payment transaction to address a late payment, among other responses. In another example, if the processing circuit 114 detects a late payment that contradicts the entity's or user's plan to improve their credit score, the processing circuit 114 may automatically initiate a payment transaction to the external system associated with the bill. This corrective action (e.g., done after obtaining the user's consent, done automatically without user's consent), not only addresses the late payment but also sends a request to update the credit reporting information, mitigating the potential negative impact on the entity's or user's performance indicator(s).

In some embodiments, the processing circuit 114 and modeling circuit 124 can determine one or more characteristics of the user data structure causing the update to the one or more performance indicators and generate a plan associated with at least one different characteristic to cause an increase to the one or more performance indicators. In some embodiments, in response to the user performing the at least one different characteristic, the processing circuit 114, through the content control circuit 128, can provide and present a reward in the GUI. In some embodiments, the reward enables another feature of the GUI. For example, the processing circuit 114 can identify financial behavior of a user such as their habits for budgeting, saving, investing, spending habits, debt management, financial goal setting, financial planning, tracking expenses, risk management, or financial education, among other habits. For example, the processor can determine when the user is more likely to miss a bill payment and can further generate a plan such as adding funds to a bill payment pool in order to pay all bills on time and further increase credit. After implementing the plan and the user no longer misses bill payments, the processor 116 and content control circuit 128 can provide a reward to the user through the I/O device 132. For example, if the user follows the plan to no longer miss any payments, the reward may be access to additional financial products of the bank. Financial products of a bank could include updated or more favorable accounts, certificates of deposits, loans, credit cards, debit cards, investment services, insurance products, foreign exchange services, and online or mobile banking services, among other products.

In some cases, the modeling circuit 124 may analyze the user's historical payment data, spending habits, and current financial situation to predict that the user or entity is likely to miss an upcoming bill payment, and this prediction could be based on a trend showing consistent late payments or depletion of funds in the associated account before the payment due date. This analysis may lead to the generation of a targeted alert or recommendation, encouraging the user or entity to take corrective action such as rescheduling payments or reallocating funds. In response to predicting a likely missed payment, the modeling circuit 124 could also present an offer (e.g., and sometimes automatically accept the offer without user or entity interaction) for a one-time financial product specifically tailored to help the user or entity avoid missing the payment, such as a short-term loan with favorable terms or a temporary increase in the overdraft limit. This offer could be made through the GUI, providing the user or entity with detailed information about the product, its benefits, and an option to accept the offer immediately, thereby giving the user or entity an opportunity to make the bill payment on time without negatively affecting their performance indicator or incurring late fees.

In some embodiments, the processing circuit 114 can perform an analysis check on previous activities of the user. For example, in some embodiments, the modeler circuit 124, data control circuit 126, or content control circuit 128 could run a security verification on any previous activity received from a user device 140, data source 170, or provider system 135 via the network 130. In some embodiments, the security verification can create a security profile corresponding to any previous activity, based on factors such as origin, transaction type, transaction location, transaction amount, and more. In some embodiments, actions that depend on the security profile of previous activities are triggered by a security threshold. According to some embodiments, previous activities are inconsistent with previous user activity data can trigger actionable events. For example, in some embodiments, when a security profile is below a security threshold, the data control circuit 126 could send instructions to the content control circuit 128 that includes sending a GUI to the user device 140 with an actionable element and at least one message associated with the triggering data. In particular, if a large and unexpected transaction from a foreign location is detected, and it falls below (or above, depending on how the threshold is set) the established security threshold, the data control circuit 126 might prompt the content control circuit 128 to send a notification to the user's mobile device through the GUI, asking them to confirm or deny the transaction.

In some embodiments, the processing circuit 114 can determine the at least one previous activity is a fraudulent activity within the user activity data and automatically remove the fraudulent activity from the user activity data. In some embodiments, the modeler circuit 124 can additionally remodel the activity data and the one or more performance indicators to generate an updated user data structure. For example, the processing circuit 114 can determine if one of a user's previous transactions is a transaction from a user's credit card that was stolen. Removing this transaction from the user's data set and remodeling the user data structure can provide for a more accurate depiction of a user's spending habits or other performance indicators.

In some embodiments, the at least one future activity of the user can be associated with a statement settlement action. In some embodiments, the processing circuit 114 or more specifically the modeler circuit can determine the statement settlement action will cause a negative account balance associated with an account of the user. In some embodiments, the processing circuit 114 can update an automatic exchange associated with the statement settlement to cause the non-negative account balance associated with the account of the user and configure a different statement settlement action to satisfy the difference between the non-negative account balance and the negative account balance. For example, through the modeling, the system can determine if the user has, or is likely to have a future bill payment. If the system determines the bill will result in a negative account balance (i.e., overdraft), the system can automatically setup another action, such as payment with a different account or payment with a credit card, among other actions, to remediate the negative balance. In some embodiments, the future activity can include a future exchange event associated with the user, and the future exchange event can cause a change in the user data structure, and in response to a selection of the at least one actionable element, the future exchange is automated based on configuring an automatic exchange between an account of the user and an external system. For example, the future exchange event could be a bill pay, which could affect the user data structure such as the account balance for the user. If the actionable element of the GUI is to set up a future automatic payment for one or more bills, if the user accepts, then the system can automatically pay the future bills, even if the future bills are occurring through an external system such as at another FI.

In some embodiments, the data control circuit 126 can be configured to perform data fusion operations, including operations to generate various data structures stored in memory 120 and used by the various circuits described herein. For example, the data manager can communicate with the user device or data sources by collecting, receiving, or identifying data relevant for use by the other circuits. The data control circuit 126 can also be configured to receive a plurality of entity data. In some arrangements, the data control circuit 126 can be configured to receive data regarding the network 130 as a whole instead of data specific to particular entity. The received data that the data control circuit 126 receives can be data that analysis system 110 aggregates and/or data that the analysis system 110 receives from the data sources 170 and/or any other system described herein (e.g., provider system 135, user device 140).

The content control circuit 128 can include circuitry for storing information such as rules for offering actionable activities for customized user data structures. The content control circuit 128 can receive data for determining or displaying actionable activities to the user from any component of the activity modeler architecture 100 (e.g., receives a future action from the modeler circuit 124 affecting a performance indicator). The content control circuit 128 may additionally store this information in memory 120. In some embodiments, the content control circuit 128 can generate content for displaying to users. The content can be selected from various resources (e.g., an update for a performance indicator sent from the data control circuit 126). The content control circuit 128 can also be structured to provide content (e.g., via a graphical user interface (GUI)) to the user device 140 over the network 130, for display within the resources. For example, the content control circuit 128 can present a GUI including actionable elements and a message associated with the actionable activity that may affect the performance indicator. The GUI can be sent via the I/O device 132 to the user device 140 through the network 130.

The content control circuit 128 can generate interfaces such as a plurality of customized dashboards, such as those described in detail below, with reference to FIGS. 4A-4F. The content control circuit 128 can generate customized user-interactive dashboards for one or more entities, such as the user device 140, based on data received from the user device 140, data source 170, and/or any other computing device described therein. The generated dashboards can include various data (e.g., data stored in the content control circuit 128 and/or modeling dataset 122) associated with one or more entities such as a user data structure, performance indicators, past, current, or future exchange history, account information, multidimensional scores, actionable activities/executables, and/or others. In certain embodiments, the analysis system 110 includes an application programming interface (API) and/or a software development kit (SDK) that facilitate the integration of other applications with the analysis system 110. For example, the analysis system 110 is configured to utilize the functionality of the user device 140 interacting with the user client application 154 through an API.

Still referring to FIG. 1, the input/output device 132 is structured to receive communications from and provide communications to users associated with the analysis system 110. The input/output device 132 is structured to exchange data, communications, instructions, etc. with an input/output component of the analysis system 110. In one embodiment, the input/output device 132 includes communication circuitry for facilitating the exchange of data, values, messages, and the like between the input/output device 132 and the components of the analysis system 110. In yet another embodiment, the input/output device 132 includes machine-readable media for facilitating the exchange of information between the input/output device and the components of the analysis system 110. In yet another embodiment, the input/output device 132 includes any combination of hardware components, communication circuitry, and machine-readable media.

In some embodiments, the input/output device 132 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 132 may provide an interface for the user to interact with various applications stored on the analysis system 110. For example, the input/output device 132 may include a keyboard, a keypad, a mouse, joystick, a touch screen, a microphone, a biometric device, a virtual reality headset, smart glasses, smart headsets, and the like. As another example, input/output device 132, may include, but is not limited to, a television monitor, a computer monitor, a printer, a facsimile, a speaker, and so on. As used herein, virtual reality, augmented reality, and mixed reality may each be used interchangeably, yet refer to any kind of extended reality, including virtual reality, augmented reality, and mixed reality.

The user devices 140 may each similarly include a network interface 142, a processing circuit 144, and an input/output device 160. The network interface 142, the processing circuit 144, and the input/output device 160 may be structured and function substantially similar to and include the same or similar components as the network interface 112, the processing circuit 114, and the input/output device 132 described above, with reference to the analysis system 110. Therefore, it should be understood that the description of the network interface 112, the processing circuit 114, and the input/output device 132 of the analysis system 110 provided above may be similarly applied to the network interface 142, the processing circuit 144, and the input/output device 160 of each of the user devices 140.

In some embodiments, the network interface 142 is similarly structured and used to establish connections with other computing systems (e.g., the analysis system 110, other user devices 140, and data sources 170) via the network 130. The network interface 142 may further include any or all of the components discussed above, with reference to the network interface 112. The processing circuit 144 similarly includes a memory 150 and a processor 146. The memory 150 and the processor 146 are substantially similar to the memory 120 and the processor 116 described above. Accordingly, the user devices 140 are similarly configured to run a variety of application programs and store associated data in a database of the memory 150 (e.g., user device dataset 152). For example, the user devices 140 may be configured to run an application such as the user client application 154 that is stored in the user device dataset 152. In another example, the user devices 140 may be configured to store various user data, such as, but not limited to, personal user device information (e.g., names, addresses, phone numbers, contacts, call logs, installed applications, and so on), user device authentication information (e.g., username/password combinations, device authentication tokens, security question answers, unique client identifiers, biometric data (such as digital representations of biometrics), geographic data, social media data, application specific data, and so on), and user device provider information (e.g., token information, account numbers, account balances, available credit, credit history, exchange histories, and so on) relating to the various accounts.

Particularly, the user client application 154 can be configured to communicate with the analysis system 110. As such, the user devices 140 can be communicably coupled to the analysis system 110 (e.g., through interactions with the modeler circuit 124, data control circuit 126, and content control circuit 128), and data sources 170. The user client application 154 may therefore communicate with the analysis system 110 and data sources 170 to perform a variety of functions. For example, the user client application 154 is similarly configured to receive user inputs (e.g., via a user interface of the user device 140) to complete interactions during a communication session with analysis system 110. For example, the user client application may be used during a communication session via an API with the analysis system to send updated user activity, such as if a company allowed a bill payment to be made late. Additionally, the user client application 154 is configured to output information to a display of user device 140 regarding information received from the analysis system 110. For example, the user client application 154 is configured to communicate with a user interface to show graphics regarding how financial history of a customer affects a performance indicator, such as an interest rate change impact on the entity, investment portfolio analysis, credit score. Further, a user response to a display of user device 140 regarding information from the analysis system can send a message, task, or instruction to the analysis system 110 via the network 130 that allows for the modeling dataset 122, modeler circuit 124, data control circuit 126, and/or content control circuit 138 to be perform an update.

The user client application 154 is further configured communicate with the analysis system 110 to allow a user (e.g., of an entity or company) associated with the various user devices 140 to update account information and/or provide feedback during a communication session based on content from the modeler circuit 124, data control circuit 126, or content control circuit 128 via the input/output device 132. The user client application 154 may also be structured to allow the user devices 140 to retrieve and submit documents, forms, account information for other providers, and/or any type of necessary information to and/or from analysis system 110 during an established session, as required to complete communication session for performance indicator-based analysis. In some embodiments, the user client application 154 may be configured to temporarily store the various documents, forms, and/or necessary information, which may then be selectively transmitted to the analysis system 110 in response to a user input (e.g., received via the input/output device 160).

The input/output device 160 of each user device 140 may function substantially similar to and include the same or similar components as the input/output device 132 previously described, with reference to the analysis system 110. As such, it should be understood that the description of the input/output device 132 provided above may also be applied to the input/output device 160 of each of the user devices 140. In some embodiments, the input/output device 160 of each user device 140 is similarly structured to receive communications from and provide communications to a user associated the user device 140.

The data sources 170 can provide data to the analysis system 110 and/or user device 140. In some arrangements, the data sources 170 can be structured to collect data from other devices on network 130 (e.g., user devices 140 and/or other third-party devices) and relay the collected data to the analysis system 110 and/or user device 140. In some embodiments, the analysis system 110 may request data associated with specific data stored in the data source (e.g., data sources 170). For example, in some arrangements, the data sources 170 can support a search or discovery engine for Internet-connected devices. The search or discovery engine may provide data from other providers that, when added to a user data structure (e.g., user data structure created by the modeler circuit 124 based on data from the modeling dataset 122) will cause an update to a performance indicator.

In some embodiments, the activity modeler architecture 100 can include provider systems 135. A provider system 135 can be communicated with to obtain or access additional activity data, where the provider system 135 can be banks or other credit issuers (e.g., credit card companies, consumer reporting companies, financial institutions (FI). In some arrangements, provider systems 135 can provide data to the analysis system 110 and/or user device 140. In some arrangements, a provider system 135 can be structured to collect data from other devices on the network 130 (e.g., user devices 140 and/or other third-party devices) and relay the collected data to the analysis system 110 and/or user device 140. In some embodiments the analysis system 110 may request data associated with specific data stored in the provider system 135. For example, in some arrangements, the provider systems 135 can support a search or discovery engine for Internet-connected devices. The search or discovery engine may provide data from other providers that, when added to a user data structure (e.g., user data structure created by the modeler circuit 124 based on data from the modeling dataset 122) will cause an update to a performance indicator.

In some embodiments, the provider system 135 can serve as a basis for the analysis system 110 to provide resource allocation authorizations. For example, a provider system (e.g., provider system 135) can provide user activity data to the analysis system 110. The processing circuit 114 can produce resource allocation authorizations based on data provided by the provider system 135. For example, the analysis system 110 could determine, based on data sent from the provider system 135, a user is eligible for a line of credit or bundled credit system. The analysis system 110 could produce a bundled resource authorization that includes new authorization parameters based on the authorization parameters of the provider systems 135.

In some arrangements, resource allocation authorizations are configured permissions by the provider system 135, delineating access to particular financial resources such as credit lines or loans. These authorizations can be defined by detailed parameters such as credit limits, interest rates, repayment terms, or eligibility criteria. Bundled resource authorizations provide a consolidation or combination of various individual authorizations, potentially from different provider systems, and include an alignment of their respective authorization parameters. By leveraging data received from provider systems 135, the analysis system 110 can algorithmically determine a user's eligibility for a line of credit or a bundled credit system, and accordingly, formulate a bundled resource authorization. This process involves an analysis of common and conflicting parameters among the provider systems 135, and generating new authorization parameters that represent an optimized, unified authorization. For example, if the authorization parameters from two different providers allow for a certain credit limit but differ in interest rates, the bundled resource authorization might blend these conflicting parameters to offer a consolidated line of credit with a newly calculated interest rate, in alignment with predefined rules or user preferences.

Figure 2:
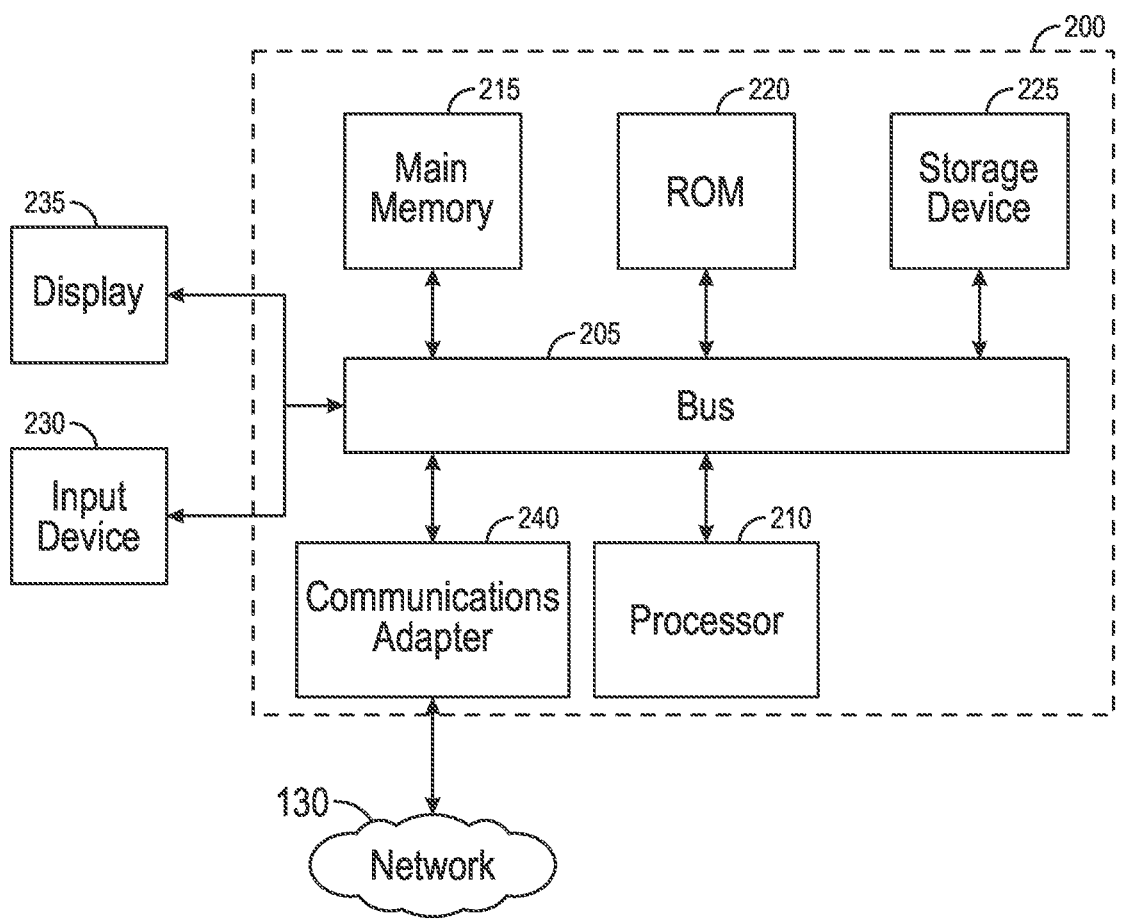
FIG. 2 is a block diagram illustrating an example computing system suitable for use in the example embodiments described herein.

Referring now to FIG. 2, a depiction of a computer system 200 is shown. The computer system 200 that can be used, for example, to implement an activity modeler architecture 100, analysis system 110, provider systems 135, user devices 140, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to enable communications with a computing or communications network 130 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 2, arrangements of the subject matter and the functional operations described in this specification can be carried out using other types of digital electronic circuitry, or in computer software (e.g., application, block-chain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some arrangements, the computing system 200 may include virtualized systems and/or system resources. For example, in some arrangements, the computing system 200 may be a virtual switch, virtual router, virtual host, virtual server. In various arrangements, computing system 200 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.).

Referring now to FIG. 3, a flowchart for a method 300 of cross-provider activity modeling is shown, according to some embodiments. Analysis system 110 can be configured to perform method 300. Further, any computing device described herein can be configured to perform method 300.

In broad overview of method 300, at block 302, the one or more processing circuits (e.g., analysis system 110 in FIG. 1) can identify user activity data and a performance indicator. At block 304, the one or more processing circuits can model user activity data and the performance indicators to generate a user data structure. At block 306, the one or more processing circuits can determine the user data structure includes at least one previous activity causing an update in the performance indicator. At block 308, the one or more processing circuits can configure the actionable activity. At block 310, the one or more processing circuits can generate and present a graphical user information including an actionable element. Additional, fewer, or different operations may be performed depending on the particular arrangement. In some embodiments, some, or all operations of method 300 may be performed by one or more processors executing on one or more computing devices, systems, or servers. In various embodiments, each operation may be re-ordered, added, removed, or repeated.

The GUI of method 300 may be provided by and/or accessible by the user client application 154 and content control circuit 128, for example. The method 300 may be performed by the analysis system 110 or the user device 140, described above pertaining to FIGS. 1 & 2. In some embodiments, method 300 begins in response to receiving, by a user device (e.g., user device 140), through a user client application (e.g., user client application 154), data from a dataset (e.g., user device dataset 152). The data can include user data, such as historical exchange settlements, performance indicator data, account exchange information across multiple providers, and activity data. In some embodiments, method begins when the analysis system 110 receives data via the network 130.

Referring now to FIG. 3 in more detail at block 302, the one or more processing circuits can identify user activity data and one or more performance indicators of a user. In some embodiments, the user activity data can refer to any and all activity of the user that might be associated with economic actions. In general, the economic actions can be broadly categorized into three types: transactional, behavioral, and informational. In some embodiments, transactional data includes, but is not limited to, all the exchanges/transactions made by the user, such as purchases, payments, fund transfers, deposits, withdrawals, etc., carried out through various channels like banking apps, credit cards, digital wallets, or other forms of online and offline transactions. This also includes transaction frequency, transaction volume, the variety of transactions, the consistency of such transactions over a period of time, etc. In some embodiments, behavioral data includes, but is not limited to, the user's interaction with financial tools and platforms. For example, how frequently the user checks their account balance, the frequency and type of inquiries about financial products or services, the response time to financial notifications, the time spent on financial educational content, etc. In some embodiments, the informational data includes, but is not limited to, the user's personal and professional details, such as age, income, occupation, education, geographical location, marital status, number of dependents, etc.

In some embodiments, the performance indicators of a user are associated with the creditworthiness of the user. This can be determined by the one or more processing circuits through various metrics such as credit score, credit history, debt-to-income ratio, and so on. In particular, a performance indicator can be a numerical expression based on a level analysis of a person's credit files, representing the creditworthiness of an individual. Related scores (e.g., additional performance indicators) could include alternative credit scores, which can be identified or calculated using non-traditional data like utility bill payments, rental payments, or social media activity. Additionally, performance indicators can include a bankruptcy risk score, which predicts the probability of a user declaring bankruptcy, and a fraud score, which indicates the likelihood of a user committing fraudulent activity.

In some embodiments, alternatives to traditional credit scores may be used as performance indicators to provide a more comprehensive and nuanced understanding of a user's financial standing. These alternatives can incorporate unconventional data and behavior patterns that might not be reflected in a standard credit score. For example, performance indicators could include an employment stability score, assessing the consistency and longevity of a user's employment history; a financial behavior score, based on spending habits, savings, and investment decisions; or a social responsibility score, reflecting a user's commitments to charitable donations or community engagement. Additionally, a payment consistency score might be used, tracking the regularity and punctuality of payments across various obligations such as subscriptions, memberships, or informal debt agreements. An interest rate change score might also be utilized, which evaluates the user's responsiveness and adaptability to fluctuations in interest rates, potentially influencing their ability to manage loans and credit lines. These alternative performance indicators can offer a perspective on the user's financial reliability, potentially benefitting individuals who may be disadvantaged by traditional credit scoring methods.

Still referring to block 302, the process of identifying user activity data and performance indicators can encompass data acquisition, data cleaning, and data classification, executed by the processing circuits. It should be understood one or more of the described steps could be skipped or altered based on the received data. In some embodiments, identifying can include data acquisition by collecting raw data from various sources (e.g., user devices 140, data sources 170, provider systems 135). For example, transactional data can be acquired from providing systems 135 that record the transactions made by the user. Behavioral data can be collected from digital platforms like banking apps or websites (e.g., data sources 170) where the user's interactions are tracked. Informational data can be obtained from user profiles in provider systems 135, or sometimes directly from users via an application of the user device 140. Performance indicators can be sourced from provider systems 135 (e.g., credit bureaus) that provide credit scores, credit histories, and other related metrics. Alternative data sources such as utility companies or social media platforms might also be used for alternative performance indicators.

In some embodiments, once the raw data is acquired, the processing circuits can clean and prepare the data for modeling (e.g., block 304). The processing circuits can clean or scrub the raw data by executing a series of actions to detect and rectify errors, inconsistencies, and inaccuracies within the data. In particular, cleaning could include handling missing or incomplete data, correcting inaccuracies, identifying and filtering outliers, and standardizing data formats. For example, transactional data sourced from different banks might be in different formats or currencies and would need to be standardized. In another example, data cleaning may include ensuring that credit scores from different credit bureaus are comparable by aligning them to a standard scale. In some embodiments, data cleaning can include addressing discrepancies in informational data. For example, if a user has multiple accounts across different banks or financial institutions, they might have provided slightly different personal information in each account, like different phone numbers or addresses. In such cases, the processing circuits can identify these discrepancies, verify the correct information, and standardize the user's personal information across all data sources. In another example, cleaning the behavioral data might involve filtering out irrelevant or misleading activities. In this example, a user might have accidentally clicked on a financial product or service multiple times without any real intention of using it. These accidental clicks could skew the user's behavioral profile and lead to inaccurate analyses. Therefore, the processing circuits could identify such anomalies and filter them out, ensuring the behavioral data accurately represents the user's genuine financial behavior and interests.

In some embodiments, the processing circuits can execute data classification to organize the cleaned data into predefined (or new) categories based on certain criteria. Data classification can include tagging and categorizing the data points to facilitate their storage, retrieval, and analysis. Each data point may be labeled with metadata that describes its attributes, such as its source, type, and other characteristics. For example, transactional data might be classified based on the type of transaction (e.g., a purchase, deposit, or withdrawal), the method used (e.g., credit card, debit card, or bank transfer), and the sector or category of expenditure (e.g., groceries, utilities, or entertainment). The other activity data, such as performance indicators, could be classified based on the type of score (e.g., credit score, bankruptcy risk score, or fraud score) and the source of the score (e.g., which credit bureau it came from). The other activity data might also factor in performance indicators that are not score-based, such as a record of consistent home ownership, frequency of major financial transactions, or the length and stability of banking relationships. In some embodiments, the processing circuits can classify behavioral data based on the user's interactions with different financial platforms or tools. For example, data related to the user's use of a banking app could be classified based on actions such as checking account balance, making transactions, reading financial advice, or setting budgeting goals. These actions can further be classified based on attributes like frequency, duration, and time of activity. In another example, informational data could be classified based on demographic or socio-economic factors. This may include attributes such as age, income level, education, employment status, geographical location, and so on. For example, income data can be classified into different income brackets, education data can be classified based on the highest degree obtained, and geographical data can be classified by city, state, or country.

At block 304, the one or more processing circuits can model the user activity data and the one or more performance indicators to generate a user data structure, wherein the user data structure corresponds to at least one future activity of the user. In some embodiments, the process of modeling can include using techniques such as machine learning, statistical analysis, and pattern recognition to establish relationships between different data points and predict future outcomes based on those relationships. In some embodiments, modeling can begin with the selection of an appropriate model based on the type of data and the specific predictions that need to be made. In some embodi-ments, the processing circuits can utilize pattern recognition methodologies to identify trends and store such information into the user data structure. For example, pattern recognition applied to user activity data can discern cyclical trends in expenditure, identifying increases at the beginning and middle of the month with a decline towards the end. By integrating this trend with performance indicators, like credit scores, the processing circuits can generate a user data structure. This structure can anticipate that individuals with higher credit scores are likely to maintain a steady spending pace throughout the forthcoming month, whereas those with lower scores may exhibit amplified cyclical variations in future spending patterns. In another example, spectral analy-sis can be utilized to analyze the frequency components embedded within a user's transaction history. By updating time-centric transaction data into a frequency-centric por-trayal, dominant financial behaviors, marked by recurrent spending frequencies, can become discernible. Correlating this with a performance indicator, such as the debt-to-income ratio, the user data structure can extrapolate that individuals with superior ratios might display more regular-ized spending behaviors in the near future, marked by fewer pronounced cyclical deviations. In yet another example, linear regression models might be selected by the processing circuits for predicting continuous outcomes such as the amount a user might spend on their credit card, while logistic regression models might be selected for predicting binary outcomes such as whether a user will make a car loan payment on time or not. It should be understood that the term modeling herein encompasses a wide range of techniques and approaches aimed at understanding patterns within data and predicting future outcomes. This could include anything from statistical methods and rule-based systems to machine learning algorithms, depending on the nature of the data and the specific predictions to be made by the processing cir-cuits. Thus, modeling involves selecting techniques based on the specific characteristics of the data, ensuring that the chosen method or methods accurately captures patterns and predicts user activities.

In some embodiments, the model parameters can be trained and optimized using the cleaned, classified, and linked user activity data and performance indicators. This training process can include using algorithms to adjust the model parameters such that the error between the model's predictions and the actual outcomes is minimized. The modeling process can also include feature engineering, which is the process of creating new features or modifying existing ones to improve the model's predictive power. For example, instead of using raw transaction amounts, a feature representing the average transaction amount over a certain period might be more predictive of a user's future economic activity.

Once one or more models or techniques are trained and/or optimized, the processing circuits can use the model to generate a user data structure that corresponds to future activities of the user. This user data structure could be a mathematical representation, a decision tree, a set of rules, or any other structure that captures the relationships between different data points and can be used to make predictions about future activities. In some embodiments, the user data structure can then be used to predict a wide range of future economic activities associated with a line of credit, such as paying a credit card bill, making a car loan payment, applying for a new loan, or even defaulting on a loan. In some embodiments, the user data structure can be utilized to forecast future economic activities related to a mortgage, such as timely monthly payments or potential refinancing scenarios. In some embodiments, the user data structure might predict behaviors tied to personal loans, encompass-ing aspects like early repayments, potential loan extensions, or seeking additional borrowing. Over time, as more user activity data and performance indicators are collected, the model can be retrained and updated to reflect the most recent patterns in the data. Moreover, the modeling process can include various safeguards to ensure privacy and security of user data (e.g., anonymizing the data).

In some embodiments, the processing circuits can use rule-based systems to model the user activity data and performance indicators. Rule-based systems can be where predefined rules are created by the processing circuits (or domain experts) to infer outcomes based on given condi-tions. For example, if a user consistently makes credit card payments in full before the due date, a rule might state that the user is likely to do the same in the future. This rule can then be applied to the user's data to predict their future activity of making a credit card payment. In some embodi-ments, the processing circuits can use statistical methods for modeling. This can involve approaches like time series analysis or trend analysis. For instance, time series analysis can be used to identify patterns in the user's past activity data, such as seasonal trends, cyclical patterns, or overall growth trends. If a user consistently increases their credit card spending during the holiday season, time series analysis can identify this pattern and predict a similar increase for the next holiday season. Trend analysis, on the other hand, can be used to identify long-term changes in the user's activity data. For example, if the user's credit score has been steadily improving over several years, trend analysis can project this trend into the future and predict a continued improvement in the credit score (i.e., stored within the user data structure).

Accordingly, the processing circuits can use a predictive modeling approach to anticipate upcoming financial obliga-tions for a user, including obligations across a diverse range of financial products such as credit cards, mortgages, loans, and others. Additionally, the modelling approach operates agnostically of the financial institution providing the service, offering an integrated and full view of a user's financial commitments. Furthermore, the predictive modeling approach executed by the processing circuits can detect seasonal or event-based patterns in the user's spending and behaviors (sometimes referred to herein as "characteris-tics"). If, for example, the user typically increases credit card spending during holiday seasons, the model can anticipate higher bill amounts during these periods (i.e., stored within the user data structure).

Referring now to FIG. 3 in more detail at block 306, the one or more processing circuits (e.g., analysis system 110 in FIG. 1) can determine the user data structure includes at least one previous activity causing an update in the perfor-mance indicator. In some embodiments, the process of modeling can include using techniques such as machine learning, statistical analysis, and pattern recognition to determine a previous activity within the use data structure causes an update in the performance indicator. In some embodiments, a previous activity can include any and all user activity data associated with their past economic actions compiled, cleaned, and residing as components of the user data structure. It should be understood that determining the user data structure includes at least one previous activity causing an update in the performance indicator encompasses a wide range of techniques and approaches aimed at under-standing patterns within data and their effects on various outputs. For example, performance indicators (e.g., credit score, credit history, debt-to-income ratio, and so on) can have set rules on how economic actions (e.g., previously defined transactional, behavioral, and informational data) affect said performance indicators. In some embodiments, having cross-platform data consolidated in a user data structure allows the analysis system to run statistical models on how previous activity causes an update in performance indicators.

In some embodiments, having consolidated previous activity allows for the analysis system 110 to project the evolution of performance indicators. Projected evolution involves projecting that the future will evolve in a certain way based on past events. Regression analysis uses statistical regression models to analyze the relationship between past events and predict future changes based on those relationships. Relating to performance indicator analysis, using credit score as an example, projected evolution allows for taking into account a person's past transactions to assess their creditworthiness and predict future credit behavior. Credit score is generally based on factors such as payment history, amount owed, new credit, length of credit history, and credit mix. Using these statistical models allows the analysis system 110 to determine if any of their previous activity causes an update in the performance indicators. For example, data provided by provider systems (e.g., provider systems 135) can allow the method to identify resource allocation authorizations associated with the provider systems 135. For example, data of a credit provider such as a separate financial institution in which a user associates with may provide the analysis system 110 with data regarding user behavior. At block 306, the analysis system 110 may determine when a bundled resource authorization (e.g., line of credit, consolidated credit line) is available to generate for the user. The method at block 306 may determine lines of credit across multiple provider systems and generate new authorization parameters based on authorization parameters of provider systems. In some embodiments, where common parameters or conflicting parameters (e.g., payment transactions, bill pay) exist across the plurality of resource allocation authorizations, the method at block 306 may model the common parameters and conflicting parameters to generate the new authorization parameters. In some embodiments, the modeling includes combining the common parameters and conflicting parameters based on a set of predefined rules or user-defined preferences. For example, because credit score is based on a predetermined set of rules, the method at block 306 may determine which previous user activity (e.g., user behavior, transactional data), would cause an update in credit score.

Still referring to block 306 of FIG. 3 in more detail, the method can determine other activity causing an update in a performance indicator. In some embodiments, after the data has been cleaned and modeled by the processing circuits (e.g., block 304), the method at block 306 monitors the user activity data and the performance indicators. The monitored activity can be a process continuously receiving new information from a user device of the user (e.g., user device 140) and one or more data sources (e.g., data source 170, provider system 135). In some embodiments, a previous activity causing an update in the performance indicators could be a discrepancy or violation in the user activity data. For example, the modeling at block 304 and following statistical analysis could identify a violation such as an overdraft violation or fraud violation. Through trained model parameters, such as trend analysis, adaptive learning, alert generation, the method at block 306 can determine when there is a violation of the actionable activity based on a comparison between the user activity data and the one or more performance indicators, and determine a desired action for increasing the performance indicators, when the comparison identifies an activity counter to the desired action. For example, the analysis system (e.g., analysis system 110) can analyze relationships and connection between entities, accounts, devices, or IP addresses for the behavioral data received. For example, if an IP address from a user's past transaction does not match the IP address for the same transaction made a month prior, a discrepancy is identified, and a violation is sent through the analysis system 110 to generate an actionable activity at block 308 such as challenging the transaction on a basis of fraud.

Still referring to block 306 of FIG. 3 in more detail, the method can determine other activity causing an update in a performance indicator. For example, in some embodiments, if the system determines previous activity involves a repetitive bill pay on the same day of every month, but the user does not have sufficient funds for the future activity of paying the bill in the future, the method at block 306 can predict an overdraft and configure an overdraft warning at block 308. Additionally, the method at block 306 could determine the account holds a low balance for an aggregate number of bills that are predicted to be due across all of the user's accounts, including accounts from a different provider system, and again configure an activity at block 308 to alert the user.

Referring now to FIG. 3 in more detail at block 308, the one or more processing circuits can configure the actionable activity. In some embodiments, the actionable activity corresponds to the future activity of the user. In some embodiments, the actionable activity is below a user threshold. In some embodiments, configuring the actionable activity is in response to determining an actionable activity is associated with the at least one previous activity. In some embodiments, configuring the actionable activity is based on the possible actionable activities determined from any of the aforementioned techniques and approaches aimed at understanding patterns within the user data and predicting future outcomes. Often, configuring the actionable activity is done so with motivation to educate the user. In some arrangements, at block 308, the one or more processing circuits can generate a plan associated with at least one different characteristic to cause an increase to the one or more performance indicators. Further, in some embodiments, the method at block 308 can provide and present a reward. In some embodiments, the generated plan might outline strategic financial actions, such as debt consolidation or diversifying investment portfolios, tailored to the user's financial profile. The reward, upon successful execution of the plan, could be access to premium banking features or reduced fees on financial services. In another instance, the reward might be a financial literacy course or workshop, aimed at further enhancing the user's financial management skills.

Still referring to FIG. 3 in more detail at block 308, the one or more processing circuits can, in response to determining an actionable activity associated with the at least one previous activity, configure the actionable activity corresponding to the at least one future activity of the user. Configuring the activity can take many forms. In some embodiments, the actionable activity is a future activity determine at block 306. For example, the statistical methods used at block 304 and block 306 can determine what the future activity and provide the details for the future activity. In some embodiments, at block 308, the circuits within the system (e.g., data control circuit 126, content control circuit 128) are configured to set activity details. The circuits configure the activity by writing instructions. For example, the circuits can predict all future billing events that are upcoming for the user across all of the cards, mortgages, loans, etc. even when the cards, mortgages, loans, etc. are serviced through different financial institutions. In some embodiments, the system can predict through adaptive learning that a customer will continue paying multiple credit card bills every month based on the customer having two auto-payments set up for credit cards as shown by credit close up data. Based on this prediction, the actionable activity can be an alert to the customer that they have credit card bills coming due before the bills are due even though the credit cards are all serviced through a different financial institution.

Still referring to FIG. 3 in more detail at block 308, in some embodiments, where there is a discrepancy or violation associated with the actionable activity based on a comparison between the user activity data or the performance indicators and a desired action for increasing the performance indicators, the comparison may identify an activity counter to the desired action. In some embodiments, at block 308 or 310, to remediate the discrepancy or violation, the system may configure and present an alert on the GUI including remediation instructions for the user. In some embodiments, the system, by the processing circuit via an application programming interface (API), may further establish a communication session with an external system associated with the activity counter to the desired action. In some embodiments, the communication session may update the external system to remove the activity counter to the desired action or initiate an exchange between an account of the user and the external system. For example, at block 308, the one or more processing circuit can determine a discrepancy or fraudulent previous activity via the statistical methods used to model the user activity data at block 304 and determining an update at block 306. Further, when a fraudulent action is determined, block 308 can configure the communication session to be presenting via an API at block 310 to ask the user what actions the user wants to take to remediate the fraudulent action. In some embodiments, the system, by the processing circuit, can then remove the fraudulent activity from the user data structure. In some embodiments, the method at block 308 can configure future exchange event to cause a change in the user data structure, and when selected, the future exchange event is automated.

Still referring to FIG. 3 in more detail at block 308, in some embodiments, the one or more processing circuits can configure the actionable activity as a bundled resource authorization. For example, through statistical analysis aforementioned, the configured activity could be bundling credit cards to decrease interest rates, determine rates across payment cards, determine a new rate, determine an introductory offer, estimate future events such as eliminating debt in a period of time.

Referring now to FIG. 3 in more detail at block 310, the one or more processors can generate and present a graphical user interface (GUI) including at least one actionable element and at least one message associated with the actionable activity. In some embodiments, the actionable element can relate to the actionable activity determined at block 308, in that the actionable element can carry out the actionable activity determined at block 308. In carrying out the actionable activity, the processors in the system can generate and present the GUI through a variety of means. In some embodiments, the method at block 310 can present the GUI through the operating system, display hardware, graphics rendering, windowing system, among other means. For example, the GUI system can incorporate event-driven programming, where actions or events trigger corresponding responses. In some embodiments, the operation system and applications of the devices used by the method can use implementations such as event handlers to update the GUI.

Still referring to FIG. 3 in more detail at block 310, the one or more processors can establish a communication session between the analysis system 110 and other external systems or devices such as a user device. To establish a communication session via an application programming interface, the method at block 310 could establish connections through connection initiation, addressing and identification, handshake and negotiation, authentication and authorization, channel establishment, data exchange, or session maintenance. The exact process and protocols used to establish a communication session can vary depending on the specific devices, network infrastructure, and communication technologies involved. Different protocols, such as TCP/IP, Bluetooth, Wi-Fi, or specific application-layer protocols, have their own mechanisms for session establishment. Connection Initiation: The initiating device, often referred to as the client, sends a request to establish a connection with the target device, known as the server. This request can be initiated through various means, such as a physical cable connection, wireless signals, or network protocol. Addressing and identification involves the initiating device specifying the address or identifier of the target device it wishes to communicate with. This can be an IP address, domain name, MAC address, or any other unique identifier depending on the communication protocol being used. Handshake and negotiation involve the devices engaging in a handshake process to negotiate communication parameters and establish a common set of rules for the session. This includes agreeing on protocols, encryption methods, data formats, and other communication settings. Authentication and authorization involve the devices performing authentication and authorization procedures to ensure the identity and permissions of each other. This can involve exchanging credentials, digital certificates, or other security measures to validate the devices' authenticity and grant access to the requested resources. Channel establishment follows the process of once the handshake is successful and authentication is completed, the devices establish a communication channel. This can involve creating a logical connection, allocating network resources, or establishing a secure tunnel to facilitate data exchange. Data Exchange involves establishing a communication channel, and then allowing the devices to start exchanging data. This can involve sending messages, transmitting files, streaming media, or any other form of information exchange based on the intended purpose of the session. Session maintenance involves the devices periodically exchanging control messages to ensure the session remains active and monitor the connection's integrity during the communication session. This includes handling potential errors, retransmission of lost data, and managing any necessary protocol-specific maintenance tasks.

Still referring to FIG. 3 in more detail at block 310, the actionable element and messages can be comprehensive of many activities. In some embodiments, the actionable activity can relate to alerting the user of predicted future billing events. In some embodiments, the actionable activity can be an alert summarizing all of the customer's future activities, such as bill pay data, including upcoming and predicted bills, across all providers, such as financial institutions. The summary can be based on provider data (e.g., data from provider system 135) such as financial institutions without the financial institutions sharing data with the system. In some embodiments, the actionable activity can apply an automatic pay system, where the system can automatically pay a bill if the system has estimated the customer has a bill that is due but has not paid it yet. For example, the system can issue, via the GUI display means mentioned, an "automatic minimum payment alteration" by sending an alert to the customer to ask them if the system should make an automated minimum payment to the appropriate financial institution so that the customer pays the bills before it becomes late. If an exchange (e.g., bill) has been determined late, the system may generate an activity to enable or automatically set up a transaction process for a customer to pay a particular provider (e.g., creditor) based on determining the customer has missed an exchange (e.g., bill) to the provider based on monitoring the customer's user activity data. In some embodiments, the GUI could be presented in a calendar format to present to the customer when the system will notify the user of future activity or when the system will automatically configure the future events. In some arrangements, at block 310, the method can generate and present the GUI to update an automatic exchange event associated with the statement settlement to cause a non-negative account balance and configure a different statement settlement action to satisfy the difference between the non-negative account balance and the negative account balance.

Still referring to FIG. 3 in more detail at block 310, the method at block 310 may display an actionable activity and message dependent on if the actionable activity is above or below a threshold amount. For example, the system can present an overdraft warning or block a payment if the customer is likely to overdraft an account based on bills that are predicted to be due. In some embodiments, an actionable activity could also relate to resource allocation authorizations. For example, the system can allocate resources dependent on previous activities. For example, in response to a previous activity determined to be fraudulent, the GUI may present a message and generate and activity to challenge the previous activity. In some embodiments, the GUI may be generated for user satisfaction. For example, in some embodiments, the system can provide rewards to the user if it has previously detected that the user has over drafted accounts but has since stopped over drafting accounts. For example, the system at block 310 can provide rewards via the GUI. In some embodiments, the reward can enable another feature of the GUI. For example, a reward can include informing the user they have gone a period of time without a discrepancy in their activity. In some embodiments, a reward could include a credit, reward points (e.g., credit card points), or other rewards.

In some embodiments, the processing circuits determine that a specific previous activity within the user activity data is fraudulent. For example, a series of microtransactions occurring at irregular intervals on a previously unused online platform might raise suspicion. These transactions, despite their small individual values, could cumulatively represent significant fraud when overlooked. Another example could be the repeated rounding up of amounts in numerous transactions, a tactic that could signify internal rounding fraud. Upon detecting such fraud, the processing circuits can automatically remove these potentially fraudulent activities from the user activity data. Subsequently, the processing circuits can remodel the user activity data in conjunction with the performance indicators, generating an updated user data structure that more accurately represents genuine user behaviors and financial trends.

In some embodiments, the processing circuits can determine that a specific future activity of the user, particularly a statement settlement action, might result in (or may cause) a negative account balance for the user's account. Upon the determination, the processing circuits can update an automatic exchange associated with that settlement, ensuring that the account balance remains non-negative. Furthermore, the processing circuits can configure a different statement settlement action to bridge the gap between the intended non-negative balance and the potentially negative balance. For example, if a user's monthly subscription to a digital service unexpectedly increases, instead of causing an overdraft, the processing circuits might delay the settlement or fractionally adjust multiple settlements to avoid negative balances. In another example, if multiple auto-debits are scheduled closely, and their combined amount surpasses the available balance, the processing circuits could stagger the settlements over a more extended period, ensuring account stability. In yet another example, recognizing an imminent negative balance in a user's primary business account, the processing circuits might facilitate an automatic funds transfer from a secondary business account or a linked savings account to ensure the primary account remains solvent during statement settlements. Similarly, when settling a subscription payment, the processing circuits, upon detecting insufficient funds in the originally designated account, might automatically communicate with the third-party subscription provider to reroute the payment source, drawing funds from an alternative account, such as a contingency checking account or a dedicated expenses account, to fulfill the subscription fee without interruption.

In some embodiments, the processing circuits can monitor the user activity data and the performance indicators by continuously receiving new information from a user device and other data sources. Upon analyzing this data, they can identify either a discrepancy in the user activity data or performance indicators based on past activities or a violation tied to the actionable activity. This violation can surface when comparing user activity data or performance indicators to a desired action meant to elevate performance indicators, particularly if an activity runs counter to this desired action. In case of such discrepancies or violations, remediation steps can be taken. For example, an alert can be displayed on the GUI offering remediation instructions for the user. Alternatively, through an API, a communication session might be established with an external system linked to the contradicting activity. This session can lead to the update of the external system to eliminate the conflicting activity or initiate a transaction between the user's account and the external system. For example, the processing circuits might detect a pattern of the user purchasing digital art tokens from lesser-known online marketplaces at unusually high prices, triggering an alert for the user to verify the validity or authenticity of the listings. In another example, if an abnormal frequency pattern is noted in a user's energy consumption payments, the system could communicate with a utility provider's API to analyze if there is any equipment malfunction or a billing error.

Figure 4A:
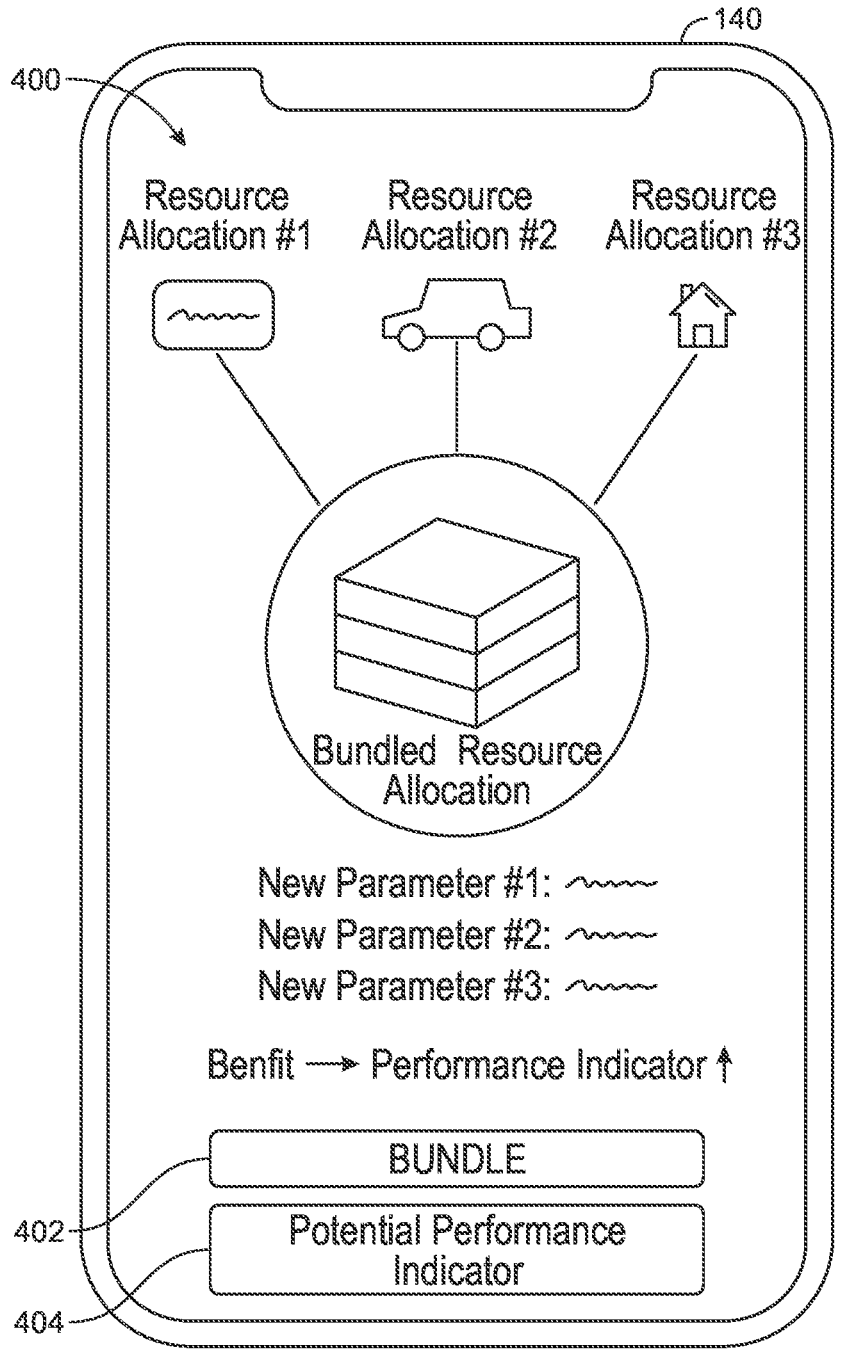
FIG. 4A is an illustration of a configuration of a user interface generated by the analysis system of FIG. 1, according to example embodiments.

Referring now to FIG. 4A, an illustration of a configuration of a user interface 400 on user device 140 is shown. The user interface 400 may be presented within the user client application 154. In some embodiments, the user interface 400 is generated and provided by the content control circuit 128. The content can contain an actionable activity or action. In some embodiments, the user interface 400 may contain one or more actionable (or interactable) buttons or items (e.g., 402 and 404) that influences an actionable activity. In some embodiments, the actionable button 402, if selected by the user, can consolidate user data from multiple data sources or accounts, offer a loan, open a new account, perform a future exchange, perform a verification check on a new addition to the input data, and/or other mechanisms to help a user's performance indicators. In some embodiments, the user interface 400 can direct the user to provide an input to the user device 140. In some embodiments, the input improves the user's performance indicator. In some embodiments, the prompt states that the input will improve the user's performance indicator. In some embodiments, the prompt states the future value of the performance indicator after the user performs the input. In some embodiments, the prompt states the change in the performance indicator after the user performs the input. In some embodiments, the input includes the user pressing actionable button 402 presented on the screen of the user device 140. In some embodiments, the user device 140 is a mobile device, such as a cellular phone and/or smart phone.

Additionally, as shown, the resource allocation #1 can be a note, the resource allocation #2 can be a car loan, and the resource allocation #3 can be a mortgage. The bundled resource allocation, in response to selecting the bundling actionable button 402, allows users to combine these different allocations under revised parameters, such as a new credit limit, altered interest rates, or modified payment schedules, offering a consolidated view and potentially more favorable terms. Such bundling can optimize the user's financial management, potentially leading to improved performance indicators or reduced interest overheads. When the user chooses the potential performance indicator interactable button 404, it can serve as a gateway to an enhanced view on the user interface 400. By redirecting to screens depicted in FIG. 4B or 4C, users can visualize the anticipated performance indicators post-bundling, offering insights into the benefits of their decisions and the estimated timeframe for realizing specific financial milestones or the elimination of certain debts.

Figure 4B:
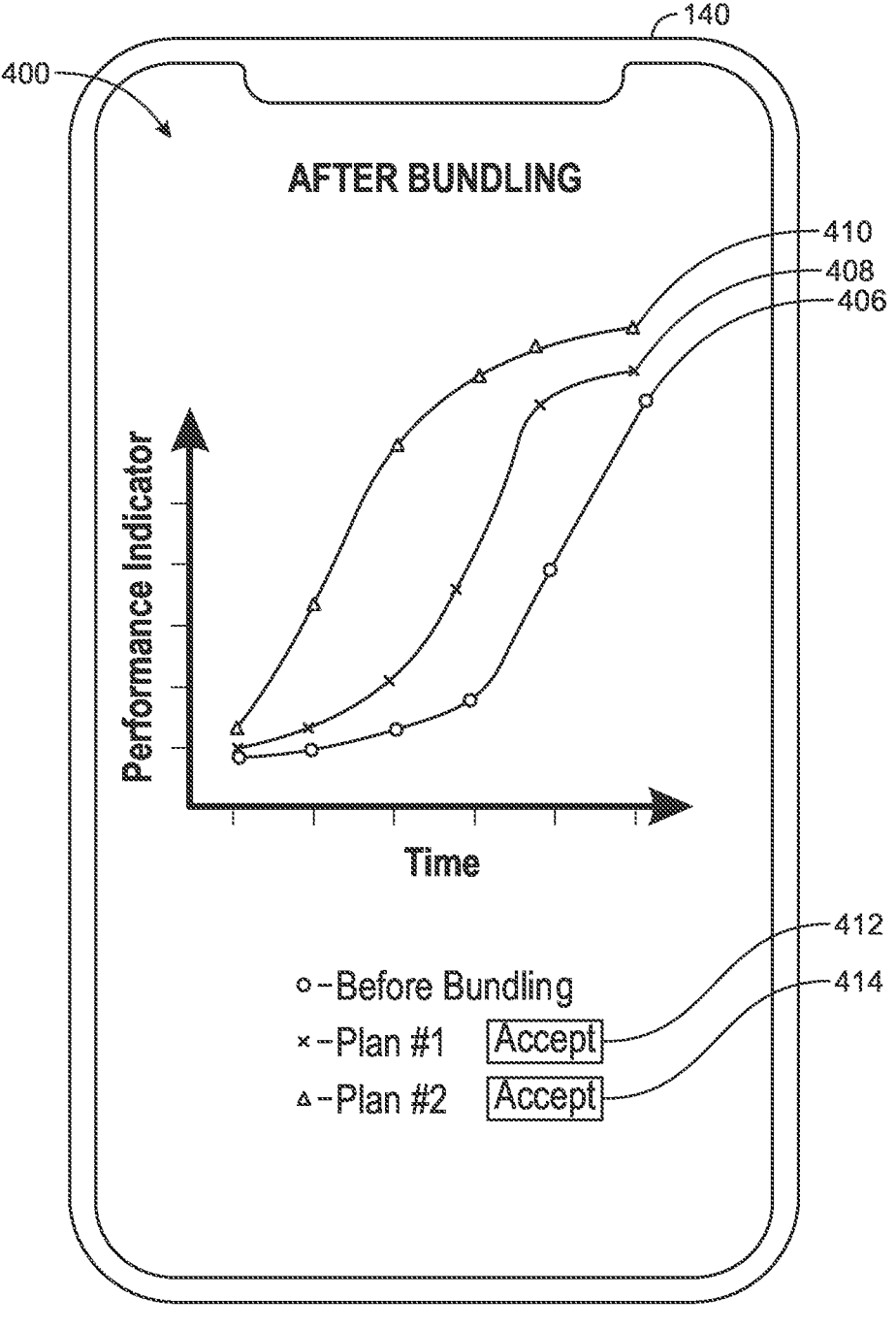
FIG. 4B is an illustration of an additional configuration of a user interface generated by the analysis system of FIG. 1, according to example embodiments.

Referring now to FIG. 4B, an illustration of a configuration of a user interface 400 on user device 140 is shown. The user interface 400 may be presented within the user client application 154. In some embodiments, the user interface 400 is generated and provided by the content control circuit 128. The content can contain metrics. In some embodiments, the user interface 400 may contain one or more actionable (or interactable) buttons or items (e.g., 412 and 414) that influences an actionable activity. As shown, the content can depict a graph of the performance before bundling 406, after bundling with plan #1, and after bundling plan #2. In some embodiments, the user can be presented with an option to accept one or more of the plans (e.g., actionable item 412 and 414). As shown, if plan #1 is accepted it will improve the performance indicator, and if plan #2 is accepted it will improve the performance indicator even greater than plan #1. For example, if plan #1 is accepted, it could result in the consolidation of multiple credit card debts into a single account, leading to a moderate increase in the credit score. Conversely, with plan #2, a user might not only consolidate their credit card debts but also refinance a high-interest car loan under more favorable terms. This approach, by reducing overall interest rates and streamlining debt management, might result in a more substantial uplift in the credit score. By presenting these potential outcomes, users can make informed decisions about how to best optimize their credit health.

Figure 4C:
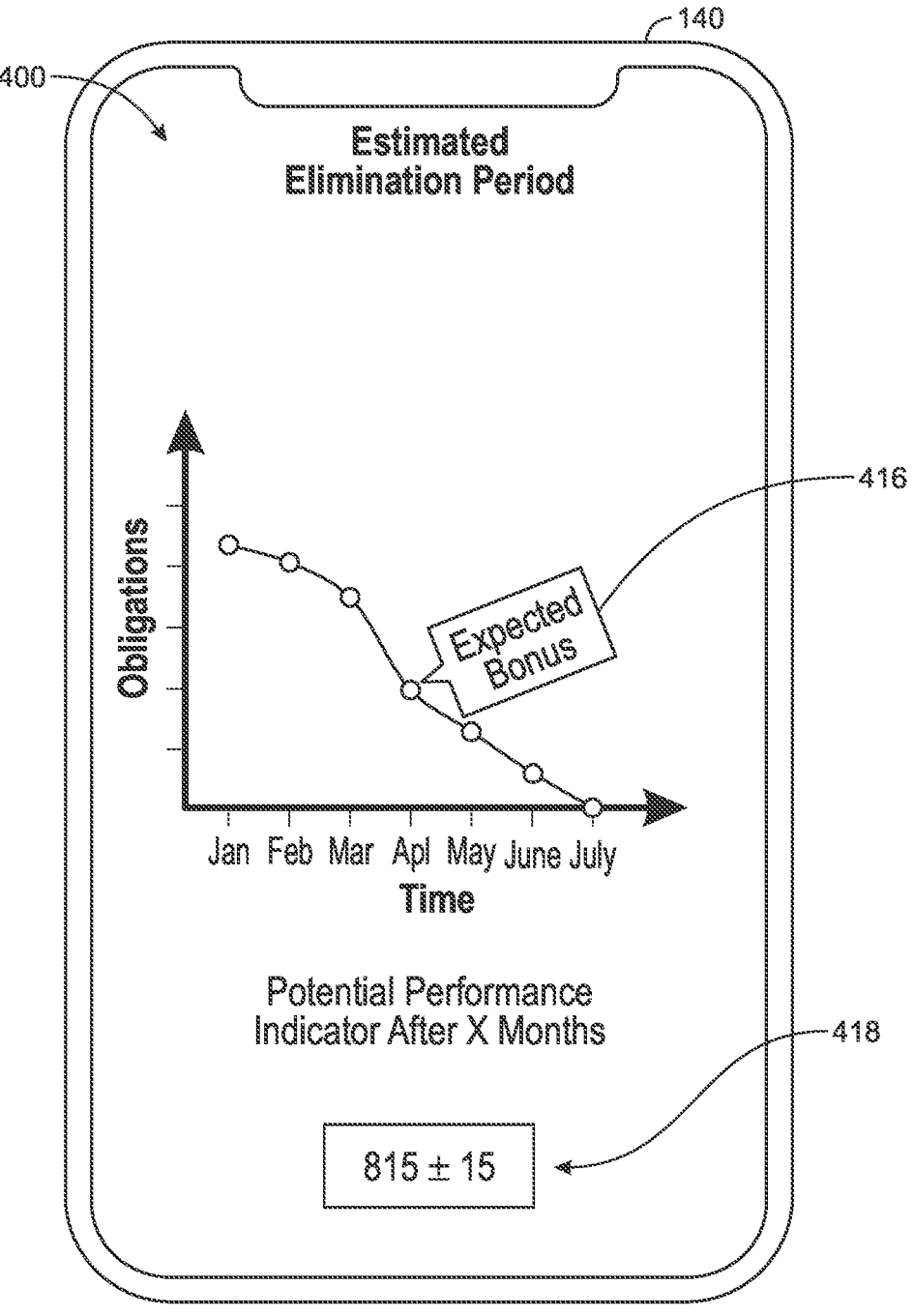
FIG. 4C is an illustration of an additional configuration of a user interface generated by the analysis system of FIG. 1, according to example embodiments.

Referring now to FIG. 4C, an illustration of a configuration of a user interface 400 on user device 140 is shown. The user interface 400 may be presented within the user client application 154. In some embodiments, the user interface 400 is generated and provided by the content control circuit 128. The content can contain metrics. In some embodiments, the future performance indicator 418 can be displayed on the user interface 400 with a graphic depicting the an amount of obligations (e.g., credit card debt, mortgages, car loans, student loans, utility bills, leases, personal loans, medical bills, tax liabilities, child support or alimony) over time of the user and a notification 416 (e.g., in April) when a bonus is expected. That is, the estimated elimination period and expected performance score after the elimination of the obligations can be presented. For example, a user viewing the interface 400 might see their car loan and credit card debt decreasing over a 7-month projection, with a notable dip in the graph around April, indicating the use of an expected bonus to reduce those obligations. Additionally, alongside this visualization, a predicted boost in their performance score (e.g., after a certain number of months such as, 6 or 12 months), such as a credit score, might be illustrated, reflecting the positive financial implications of fulfilling those obligations.

Figure 4D:
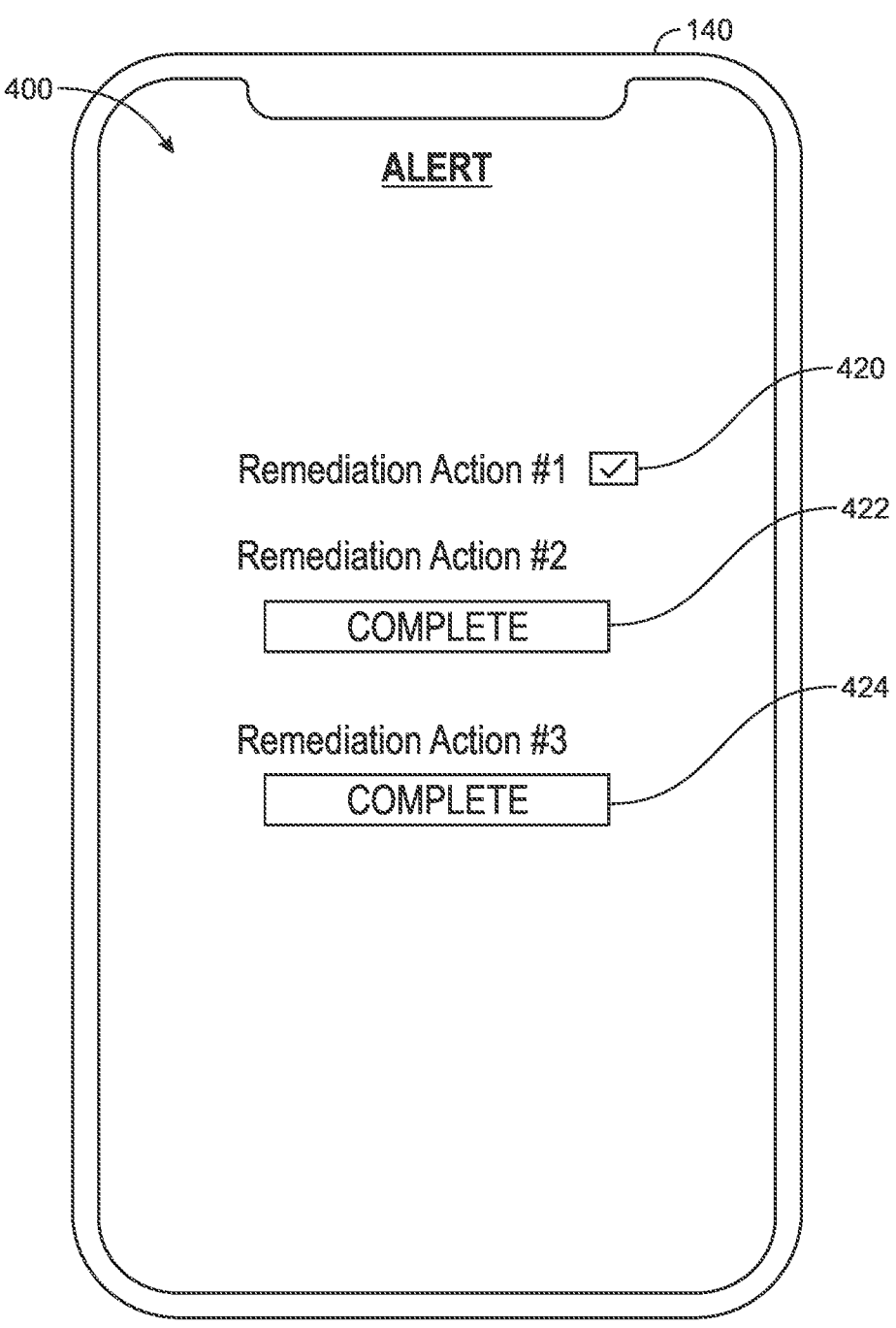
FIG. 4D is an illustration of an additional configuration of a user interface generated by the analysis system of FIG. 1, according to example embodiments.

Referring now to FIG. 4D, an illustration of a configuration of a user interface 400 on user device 140 is shown. The user interface 400 may be presented within the user client application 154. In some embodiments, the user interface 400 is generated and provided by the content control circuit 128. The content can contain interactable or actionable items 420, 422, and 424. As shown, alerts can include remediation actions that have been completed (e.g., remediation action #1) and potential future remediation actions to complete (e.g., remediation action #2, remediation action #3). In some embodiments, a remediation action can include remediating past payments, rectifying past missed payments, consolidating lines of credit, generating a reward, performing a fraud check on exchanges, negotiating a lower interest rate with creditors, automating monthly bill payments, or offering financial literacy resources to help users understand and manage their obligations better, among others. For example, upon selecting remediation action #2 button 422, the system can offer a plan to rectify past missed payments by adjusting upcoming payment schedules or negotiating with lenders for a one-time forgiveness. In another example, remediation action #3 button 424 can be selected to initiate an immediate fraud check on recent transactions, ensuring that no unauthorized activities have occurred.

Figure 4E:
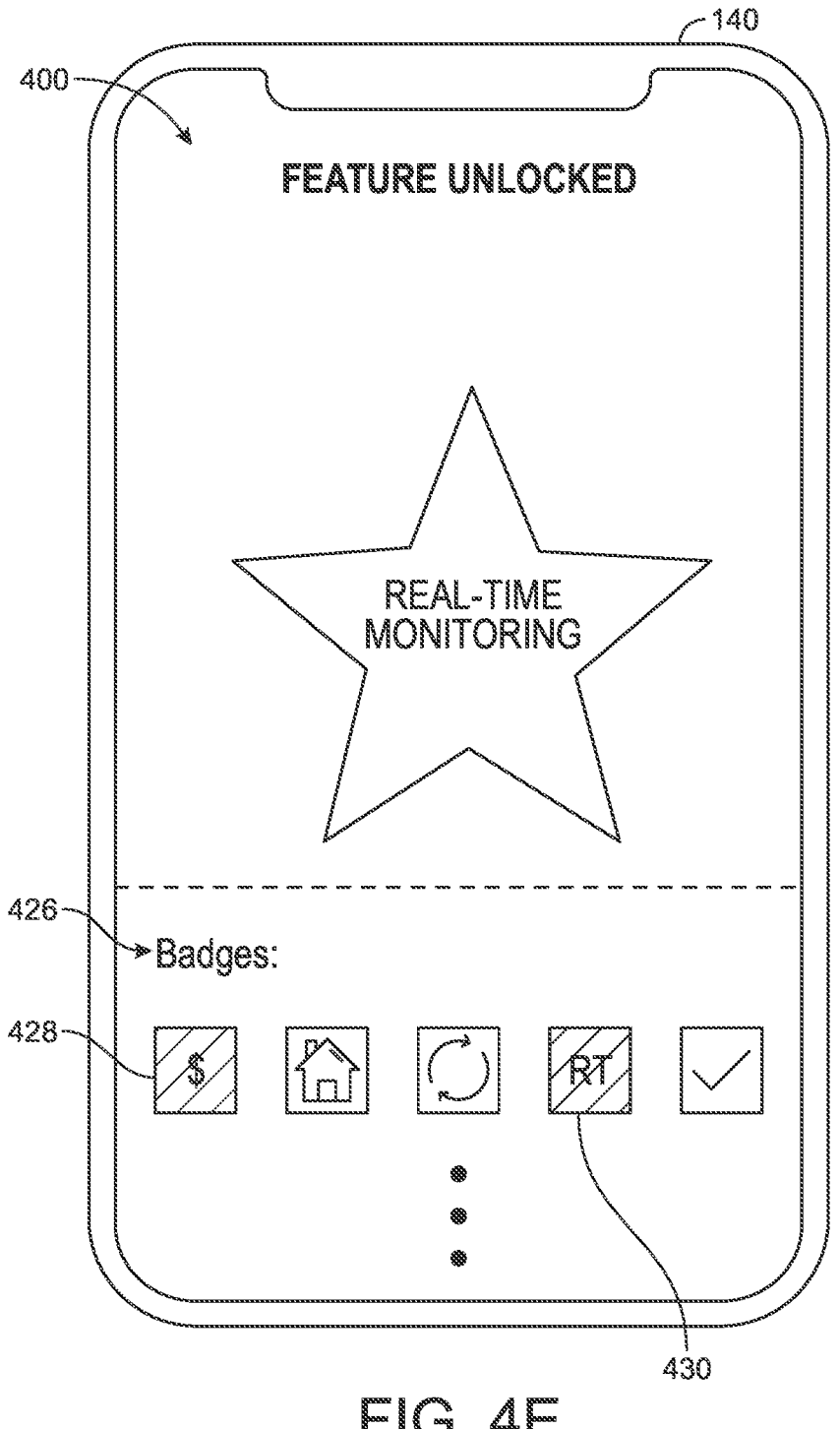
FIG. 4E is an illustration of an additional configuration of a user interface generated by the analysis system of FIG. 1, according to example embodiments.

Referring now to FIG. 4E, an illustration of a configuration of a user interface 400 on user device 140 is shown. The user interface 400 may be presented within the user client application 154. In some embodiments, the user interface 400 is generated and provided by the content control circuit 128. The content can contain content 426, 428 and 430. As shown, the feature unlocked can be a reward system presented in the user interface 400 that can be adjusted upon actions by the customer. In some embodiments, the analysis system 110 can perform real-time monitoring and the badges can be presented that indicate if they have been "unlocked" or are still "locked." The badges can act or depict rewards, for example, when a user performs a favorable action towards their financial or economic health. For example, badge 428 can be a premium or upgraded checking account which is highlighted or filled in indicating it was unlocked. In another example, badge 430 is unlocked and is related to real-time credit monitoring. Additional badges could be obtained by users meeting certain benchmarks or achieving financial milestones. For example, a user might unlock a badge for maintaining a certain savings balance over three consecutive months, or another badge is unlocked once a user completes a set number of financial literacy courses through the application.

Figure 4F:
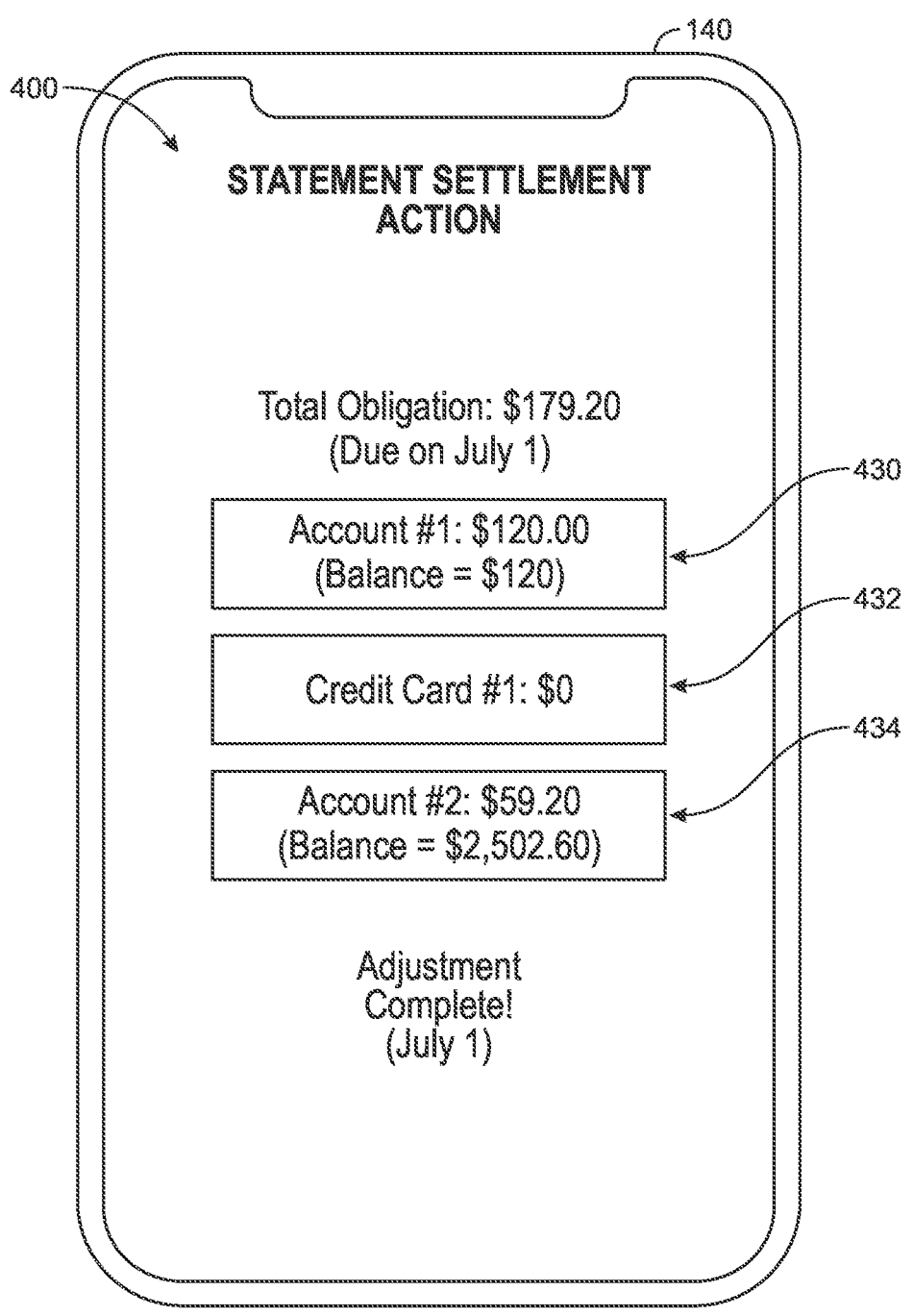
FIG. 4F is an illustration of an additional configuration of a user interface generated by the analysis system of FIG. 1, according to example embodiments.

Referring now to FIG. 4F, an illustration of a configuration of a user interface 400 on user device 140 is shown. The user interface 400 may be presented within the user client application 154. In some embodiments, the user interface 400 is generated and provided by the content control circuit 128. The content can contain content 430, 432, and 434. As shown, a statement settlement action can be presented to the user that indicates an obligation (e.g., due date of a bill) and actions the analysis system 110 is to perform given that account #1 (content 430) contains an amount less than the obligation. As shown, the analysis system 110 can automatically adjust or set how the obligation is to be paid, such as by allocating additional funds from account #2 (content 434) without incurring a balance on credit card #1 (content 432). Thus, the systems and methods can provide solutions for payment adjustments, drawing from various accounts to ensure obligations are met without accruing additional debt and/or overdraft issues.

It should be understood that no claim element herein is to be construed under the provisions of 35 U.S.C. § 112 (f) unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory).

Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the smart table system may be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:

identifying, by one or more processing circuits, user activity data and one or more performance indicators of a user, wherein user activity data comprises financial activity associated with the user and where a performance indicator is a metric indicative of a creditworthiness of the user;

modeling, by the one or more processing circuits, the user activity data and the one or more performance indicators using one or more machine learning models, wherein the one or more machine learning models are selected based on a type of the user activity data, a type of the one or more performance indicators, and a type of modeling to be performed;

identifying, using the modeled user activity data and the one or more performance indicators, a pattern in the user activity data;

generating, by the one or more processing circuits, using the modeled user activity data, the one or more performance indicators, and the identified pattern, a user data structure, wherein the user data structure is a representation of one or more relationships between two or more of the modeled user activity data, the one or more performance indicators, or the identified pattern;

predicting, by the one or more processing circuits, using the generated user data structure, at least one future activity of the user;

determining, by the one or more processing circuits, the user data structure comprises at least one previous activity of the user that impacts the one or more performance indicators;

determining, by the one or more processing circuits, an actionable activity to be performed based on the at least one previous activity, wherein the actionable activity is performed by a financial institution associated with the user for the user;

configuring, by the one or more processing circuits, the actionable activity to be executed based on the at least one future activity of the user;

generating and presenting, by the one or more processing circuits, a graphical user interface (GUI) comprising at least one actionable element and at least one message associated with the actionable activity; and executing, by the one or more processing circuits, the actionable activity responsive to a selection of the at least one actionable element by the user.

2. The method of claim 1, further comprising:

identifying, by the one or more processing circuits, a plurality of resource allocation authorizations associated with at least two provider computing systems, wherein each of the plurality of resource allocation authorizations correspond to at least one authorization parameter to utilize one or more resources of each of the at least two provider computing systems; and determining, by the one or more processing circuits, a bundled resource authorization to offer to the user in the GUI, wherein the bundled resource authorization comprises generating one or more new authorization parameters based on the at least one authorization parameter of each of the at least two provider computing systems.

3. The method of claim 2, further comprising:

determining, by the one or more processing circuits, one or more authorization parameters common to each other across the plurality of resource allocation authorizations;

determining, by the one or more processing circuits, one or more authorization parameters conflicting with each other across the plurality of resource allocation authorizations; and modeling, by the one or more processing circuits, the one or more authorization parameters common to each other and the one or more authorization parameters conflicting with each other to generate the one or more new authorization parameters, wherein modeling comprises combining the one or more authorization parameters common to each other and resolving the one or more authorization parameters conflicting with each other based on a set of predefined rules or user-defined preferences.

4. The method of claim 3, wherein the one or more processing circuits consolidate the plurality of resource allocation authorizations into the bundled resource authorization that provides a positive impact on the one or more performance indicators by increasing the creditworthiness of the user, and wherein the bundled resource authorization comprises an estimated elimination period for satisfying one or more obligations associated with the plurality of resource allocation authorizations.

5. The method of claim 1, further comprising:

monitoring, by the one or more processing circuits, the user activity data and the one or more performance indicators based on continuously receiving new information from a user device of the user and one or more data sources;

determining, by the one or more processing circuits, at least one of:

a discrepancy in the at least one of the user activity data or the one or more performance indicators based on the at least one previous activity of the user;

a violation associated with the actionable activity based on a comparison between the at least one of the user activity data or the one or more performance indicators and an action to take to increase the one or more performance indicators of the user, wherein the comparison identifies an activity counter to the action;

remediating, by the one or more processing circuits, the discrepancy or violation based on at least one of:

presenting, by the one or more processing circuits, an alert on the GUI comprising remediation instructions for the user; and establishing, by the one or more processing circuits via an application programming interface (API), a communication session with an external system associated with the activity counter to the action and either (1) updating the external system to remove the activity counter to the action or (2) initiating an exchange between an account of the user and the external system.

6. The method of claim 1, further comprising:

determining, by the one or more processing circuits, one or more characteristics of the user data structure that cause the impact to the one or more performance indicators;

generating, by the one or more processing circuits, a plan associated with at least one different characteristic to cause an increase to the one or more performance indicators; and in response to the user performing the at least one different characteristic, providing and presenting a reward in the GUI, wherein the reward enables another feature of the GUI.

7. The method of claim 1, further comprising:

determining, by the one or more processing circuits, the at least one previous activity is a fraudulent activity within the user activity data;

automatically removing, by the one or more processing circuits, the fraudulent activity from the user activity data; and remodeling, by the one or more processing circuits, the user activity data and the one or more performance indicators to generate an updated user data structure.

8. The method of claim 1, wherein the at least one future activity of the user is associated with a statement settlement action, the method further comprising:

determining, by the one or more processing circuits, the statement settlement action will cause a negative account balance associated with an account of the user;

updating, by the one or more processing circuits, an automatic exchange associated with the statement settlement action to cause a non-negative account balance associated with the account of the user; and configuring, by the one or more processing circuits, a different statement settlement action to satisfy the difference between the non-negative account balance and the negative account balance.

9. The method of claim 1, wherein the at least one future activity comprises a future exchange event associated with the user, wherein the future exchange event causes a change in the user data structure, and wherein in response to a selection of the at least one actionable element, the future exchange event is automated based on configuring an automatic exchange between an account of the user and an external system.

10. A system, comprising:

a processing circuit comprising memory and one or more processors, the processing circuit configured to:

identify user activity data and one or more performance indicators of a user, wherein the user activity data comprises financial activity associated with the user and where a performance indicator is a metric indicative of a creditworthiness of the user;

model the user activity data and the one or more performance indicators using one or more machine learning models, wherein the one or more machine learning models are selected based on a type of the user activity data, a type of the one or more performance indicators, and a type of modeling to be performed;

identify, using the modeled user activity data and the one or more performance indicators, a pattern in the user activity data;

generate, using the modeled user activity data, the one or more performance indicators, and the identified pattern, a user data structure, wherein the user data structure is a representation of one or more relationships between two or more of the modeled user activity data, the one or more performance indicators, or the identified pattern;

predict, using the generated user data structure, at least one future activity of the user;

determine the user data structure comprises at least one previous activity of the user that impacts the one or more performance indicators;

determine an actionable activity to be performed based on the at least one previous activity, wherein the actionable activity is performed by a financial institution associated with the user for the user;

configure the actionable activity to be executed based on the at least one future activity of the user;

generate and present a graphical user interface (GUI) comprising at least one actionable element and at least one message associated with the actionable activity; and execute the actionable activity responsive to a selection of the at least one actionable element by the user.

11. The system of claim 10, wherein the memory and one or more processors are further configured to:

identify a plurality of resource allocation authorizations associated with at least two provider computing systems, wherein each of the plurality of resource allocation authorizations correspond to at least one authorization parameter to utilize one or more resources of each of the at least two provider computing systems; and determine a bundled resource authorization to offer the user in the GUI, wherein the bundled resource authorization comprises generating one or more new authorization parameters based on the at least one authorization parameter of each of the at least two provider computing systems.

12. The system of claim 11, wherein the processing circuit is 12. Further configured to:

determine one or more authorization parameters common to each other across the plurality of resource allocation authorizations;

determine one or more authorization parameters conflicting with each other across the plurality of resource allocation authorizations; and model the one or more authorization parameters common to each other and the one or more authorization parameters conflicting with each other to generate the one or more new authorization parameters, wherein modeling comprises combining the one or more authorization parameters common to each other and resolving the one or more authorization parameters conflicting with each other based on a set of predefined rules or user-defined preferences.

13. The system of claim 12, wherein the processing circuit is further configured to consolidate the plurality of resource allocation authorizations into the bundled resource authorization that provides a positive impact on the one or more performance indicators by increasing the creditworthiness of the user, and wherein the bundled resource authorization comprises an estimated elimination period for satisfying one or more obligations associated with the plurality of resource allocation authorizations.

14. The system of claim 10, wherein the processing circuit is further configured to:

monitor the user activity data and the one or more performance indicators based on continuously receiving new information from a user device of the user and one or more data sources;

determine at least one of:

a discrepancy in the at least one of the user activity data or the one or more performance indicators based on the at least one previous activity of the user;

a violation associated with the actionable activity based on a comparison between the at least one of the user activity data or the one or more performance indicators and an action to take to increase the one or more performance indicators of the user, wherein the comparison identifies an activity counter to the action; and remediate the discrepancy or violation based on at least one of:

present an alert on the GUI comprising remediation instructions for the user;

establish, via an application programming interface (API), a communication session with an external system associated with the activity counter to the action and either (1) updating the external system to remove the activity counter to the action or (2) initiating an exchange between an account of the user and the external system.

15. The system of claim 10, wherein the processing circuit is further configured to:

determine one or more characteristics of the user data structure that cause the impact to the one or more performance indicators;

generate a plan associated with at least one different characteristic to cause an increase to the one or more performance indicators; and in response to the user performing the at least one different characteristic, provide and present a reward in the GUI, wherein the reward enables another feature of the GUI.

16. The system of claim 10, wherein the processing circuit is further configured to:

determine the at least one previous activity is a fraudulent activity within the user activity data;

automatically remove the fraudulent activity from the user activity data; and remodel the user activity data and the one or more performance indicators to generate an updated user data structure.

17. The system of claim 10, wherein the at least one future activity of the user is associated with a statement settlement action, and wherein the processing circuit is further configured to:

determine the statement settlement action will cause a negative account balance associated with an account of the user;

update an automatic exchange associated with the statement settlement action to cause a non-negative account balance associated with the account of the user; and configure a different statement settlement action to satisfy the difference between the non-negative account balance and the negative account balance.

18. The system of claim 10, wherein the at least one future activity comprises a future exchange event associated with the user, wherein the future exchange event causes a change in the user data structure, and wherein in response to a selection of the at least one actionable element, the future exchange event is automated based on configuring an automatic exchange between an account of the user and an external system.

19. A non-transitory computer-readable storage medium (CRM) having instructions stored thereon that, when executed by at least one processing circuit, cause the at least one processing circuit to perform operations comprising:

identifying user activity data and one or more performance indicators of a user, wherein the user activity data comprises financial activity associated with the user and where a performance indicator is a metric indicative of a creditworthiness of a user;

modeling the user activity data and the one or more performance indicators using one or more machine learning models, wherein the one or more machine learning models are selected based on a type of the user activity data, a type of the one or more performance indicators, and a type of modeling to be performed;

identifying, using the modeled user activity data and the one or more performance indicators, a pattern in the user activity data;

generating, using the modeled user activity data, the one or more performance indicators, and the identified pattern, a user data structure, wherein the user data structure is a representation of one or more relationships between two or more of the modeled user activity data, the one or more performance indicators, or the identified pattern;

predicting, using the generated user data structure, at least one future activity of the user;

determining the user data structure comprises at least one previous activity of the user that impacts the one or more performance indicators;

determining an actionable activity to be performed based on the at least one previous activity, wherein the actionable activity is performed by a financial institution associated with the user for the user;

configuring the actionable activity to be executed based on the at least one future activity of the user;

generating and presenting a graphical user interface (GUI) comprising at least one actionable element and at least one message associated with the actionable activity; and executing the actionable activity responsive to a selection of the at least one actionable element by the user.

20. The CRM of claim 19, wherein the operations further comprise:

identifying a plurality of resource allocation authorizations associated with at least two provider computing systems, wherein each of the plurality of resource allocation authorizations correspond to at least one authorization parameter to utilize one or more resources of each of the at least two provider computing systems; and determining a bundled resource authorization to offer to the user in the GUI, wherein the bundled resource authorization comprises generating one or more new authorization parameters based on the at least one authorization parameter of each of the at least two provider computing systems.

* * * * *